(12) United States Patent
Ponulak et al.

(10) Patent No.: US 8,943,008 B2
(45) Date of Patent: Jan. 27, 2015

(54) APPARATUS AND METHODS FOR REINFORCEMENT LEARNING IN ARTIFICIAL NEURAL NETWORKS

(75) Inventors: Filip Ponulak, San Diego, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 255 days.

(21) Appl. No.: 13/489,280

(22) Filed: Jun. 5, 2012

(65) Prior Publication Data
US 2013/0325776 A1    Dec. 5, 2013

(51) Int. Cl.
G06F 15/18    (2006.01)
G06N 3/08    (2006.01)

(52) U.S. Cl.
USPC .......................................................... 706/25

(58) Field of Classification Search
None
See application file for complete search history.

(56) References Cited

U.S. PATENT DOCUMENTS

| | | | |
|---|---|---|---|
| 5,092,343 A | 3/1992 | Spitzer et al. |
| 5,245,672 A | 9/1993 | Wilson et al. |
| 5,355,435 A | 10/1994 | Deyong et al. |
| 5,388,186 A | 2/1995 | Bose |
| 5,408,588 A | 4/1995 | Ulug |
| 5,467,428 A | 11/1995 | Ulug |
| 5,673,367 A | 9/1997 | Buckley |
| 6,363,369 B1 | 3/2002 | Liaw et al. |
| 6,643,627 B2 | 11/2003 | Liaw et al. |
| 7,395,251 B2 | 7/2008 | Linkser |
| 7,426,501 B2 | 9/2008 | Nugent |
| 7,672,920 B2 | 3/2010 | Ito et al. |
| 2003/0050903 A1 | 3/2003 | Liaw et al. |
| 2007/0022068 A1 | 1/2007 | Linkser |
| 2009/0043722 A1 | 2/2009 | Nugent |
| 2011/0119215 A1 | 5/2011 | Elmegreen et al. |
| 2013/0073080 A1 | 3/2013 | Ponulak |
| 2013/0151448 A1 | 6/2013 | Ponulak |
| 2013/0151449 A1 | 6/2013 | Ponulak |
| 2013/0151450 A1 | 6/2013 | Ponulak |
| 2013/0325776 A1 | 12/2013 | Ponulak et al. |
| 2014/0025613 A1 | 1/2014 | Ponulak |

OTHER PUBLICATIONS

Supervised Learning in Spiking Neural Networks with ReSuMe Method Filip Ponulak Doctoral Dissertation Poznań, Poland, 2006.*

(Continued)

*Primary Examiner* — Kakali Chaki
*Assistant Examiner* — Ababacar Seck
(74) *Attorney, Agent, or Firm* — Gazdzinski & Associates, PC

(57) ABSTRACT

Neural network apparatus and methods for implementing reinforcement learning. In one implementation, the neural network is a spiking neural network, and the apparatus and methods may be used for example to enable an adaptive signal processing system to effect focused exploration by associative adaptation, including providing a negative reward signal to the network, which may increase excitability of the neurons in combination with decrease in excitability of active neurons. In certain implementations, the increase is gradual and of smaller magnitude, compared to the excitability decrease. In some implementations, the increase/decrease of the neuron excitability is effectuated by increasing/decreasing an efficacy of the respective synaptic connections delivering presynaptic inputs into the neuron. The focused exploration may be achieved for instance by non-associative potentiation configured based at least on the input spike rate. The non-associative potentiation may further comprise depression of connections that provide input in excess of a desired limit.

23 Claims, 11 Drawing Sheets

(56) References Cited

OTHER PUBLICATIONS

Reinforcement Learning Through Modulation of Spike-Timing-Dependent Synaptic Plasticity Razvan V. Florian Neural Computation 19, 1468-1502 (2007) C 2007 Massachusetts Institute of Technology.*

Reinforcement Learning in Intelligent Control: A Biologically-Inspired Approach to the Re/earning Problem Brendan D'Cruz May 1998.*

Phenomenological models of synaptic plasticity based on spike timing Abigail Morrison • Markus Diesmann • Wulfram Gerstner Accepted: Apr. 9, 2008 © The Author(s) 2008.*

Bennett, M.R., (1999), The early history of the synapse: from Plato to Sherrington. *Brain Res. Bull.*, 50(2): 95-118.

Fausett, L.V., (1994), *Fundamentals of Neural Networks: Architectures, Algorithms and Applications*, Prentice-Hall.

Fremaux, N. et al. (2010), *Functional requirements for Reward-Modulated Spike-Timing Dependent Plasticity*, J. a/Neuroscience, 30(4):13326-13337.

Gerstner W. and Kistler W. (2002) *Spiking Neuron Models. Single Neurons, Populations, Plasticity*, Cambridge University Press.

Haykin, S., (1999), *Neural Networks: A Comprehensive Foundation (Second Edition)*, Prentice-Hall.

Hertz J., Krogh A., and Palmer R. (1991) *Introduction to the Theory of Neural Networks*, Addison-Wesley.

"In search of the artificial retina" [online], *Vision Systems Design*, Apr. 1, 2007.

Izhikevich, E. (2007), *Solving the Distal Reward Problem through Linkage of STDP and Dopamine Signaling*, Cerebral Cortex, 17, 2443-2452.

Kenji Doya (2000), *Reinforcement Learning in Continuous Time and Space*, Neural Computation, 12:1, 219-245.

Klute, G.K., Czerniecki, J.M., and Hannaford, B. (2002). *Artificial Muscles: Actuators for Biorobotic Systems*. The International Journal 0./Robotics Research 21:295-309.

Lendek Z.S., Babuska R., and De Schutter B. (2006) *State Estimation under Uncertainty: A Survey*. Technical report 06-004, Delft Center for Systems and Control Delft University of Technology.

Legenstein, R., et al. (2008), *A learning theory for reward-modulated spike timing-dependent plasticity with application to biofeedback*. PLoS Computational Biology, 4(10): 1-27.

Nikolic, K., San Segundo Bello D., Delbruck T, Liu, S., and Roska, B. *High-sensitivity silicon retina for robotics and prosthetics*, 2011.

Ponulak, F., (2005), *ReSuMe—New supervised learning method for Spiking Neural Networks. Technical Report*, Institute of Control and Information Engineering, Poznan University of Technology.

Ponulak, F., Kasinski, A., (2010) *Supervised Learning in Spiking Neural Networks with ReSuMe: Sequence Learning, Classification and Spike-Shifting*. Neural Comp., 22(2): 467-510.

R.S. Sutton and A.G. Barto (1998), *Reinforcement Learning, an Introduction*. MIT Press.

Samad T., (Ed.) (2001) *Perspectives in Control: New Concepts and Applications*, IEEE Press, NJ.

Schreiber S .et al. (2003), *A new correlation-based measure of spike timing reliability*. Neurocomputing, 52-54, 925-931.

Sherrington, C.S., (1897); *The Central Nervous Systems*. A Textbook of Physiology, 7th ed., part III, Ed. by Foster M. Macmillian and Co. Ltd., London, p. 929.

Sutton R.S. (1988). *Learning to predict by the methods of temporal differences*. Machine Learning 3(1), 9-44.

Stein, R.B., (1967). *Some models of neural variability*. Biophys. J., 7: 37-68.

Werbos P.J. (1992), or Prokhorov D.V and Wunsch D.C. (1997) *Adaptive Critic Designs*, IEEE Trans Neural Networks, vol. 8, No. 5, pp. 997-1007.

White, D. and Sofge, D. (Eds.) (1992) *Handbook of Intelligent Control: Neural, Fuzzy and Adaptive Approaches*. Van Nostrand Reinhold, New York.

Widrow B, Hoff. M.E. (1960) *Adaptive Switching Circuits*. IRE WESCON Convention Record 4: 96-104.

*Supervised Learning in Spiking Neural Networks with ReSuMe Method*. Filip Ponulak, Doctoral Dissertation Poznan, Poland, 2006.

*Reinforcement Learning Through Modulation of Spike-Timing-Dependent Synaptic Plasticity*, Razvan V. Florian Neural Computation 19, 1468-1502 (2007) Massachusetts Institute of Technology.

*Reinforcement Learning in Intelligent Control: A Biologically-Inspired Approach to the Re/earning Problem*, Brendan D'Cruz May 1998.

*Phenomenological models of synaptic plasticity based on spike timing*, Abigail Morrison, Markus Diesmann, Wulfram Gerstner Received: Jan. 16, 2008/Accepted: Apr. 9, 2008 © The Author(s) 2008.

Alexandros Bouganis and Murray Shanahan, "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.

Xiaohoi Xie and H. Sebastian Seung, "Learning in neural networks by reinforcement of irregular spiking", Physical Review E, vol. 69, letter 0419119, 2004, pp. 1-10.

Helene Paugam-Moisy and Sander Bohte, "Computing with Spiking Neuron Networks" from Eds. {G. Rozenberg, T. Back, J. Kok} of Handbook of Natural Computing, publshied by Springer Verlag, 2009, pp. 1-47.

Floreano et al. "Neuroevolution: From Architectures to learning" Evol. Intel. Jan. 2008 1:47-62 (retrieved online on Apr. 24, 2013 from http://infoscience.epfl.ch/record/112676/files/FloreanoDuerrMattiussi2008.pdf).

\* cited by examiner

State response due to focused exploration of the disclosure

State response due to exploration of the prior art

APPARATUS AND METHODS FOR REINFORCEMENT LEARNING IN ARTIFICIAL NEURAL NETWORKS

CROSS-REFERENCE TO RELATED APPLICATIONS

This application is related to co-owned U.S. patent application Ser. No. 13/238,932 filed Sep. 21, 2011, and entitled "ADAPTIVE CRITIC APPARATUS AND METHODS", U.S. patent application Ser. No. 13/313,826, filed Dec. 7, 2011, entitled, "APPARATUS AND METHODS FOR IMPLEMENTING LEARNING FOR ANALOG AND SPIKING SIGNALS IN ARTIFICIAL NEURAL NETWORKS", U.S. patent application Ser. No. 13/314,066, filed Dec. 7, 2011, entitled, "NEURAL NETWORK APPARATUS AND METHODS FOR SIGNAL CONVERSION", U.S. patent application Ser. No. 13/488,106, filed on Jun. 4, 2012, entitled "SPIKING NEURON NETWORK APPARATUS AND METHODS", U.S. patent application Ser. No. 13/488,114, filed on Jun. 4, 2012, entitled "SPIKING NEURON NETWORK APPARATUS AND METHODS", U.S. patent application Ser. No. 13/487,499, filed Jun. 4, 2012, entitled, "APPARATUS AND METHODS FOR IMPLEMENTING GENERALIZED PROBABILISTIC LEARNING RULES", U.S. patent application Ser. No. 13/487,533, filed on Jun. 4, 2012, entitled "STOCHASTIC SPIKING NETWORK APPARATUS AND METHODS", U.S. patent application Ser. No. 13/487,576, filed on Jun. 4, 2012, entitled "DYNAMICALLY RECONFIGURABLE STOCHASTIC LEARNING APPARATUS AND METHODS", and U.S. patent application Ser. No. 13/487,621, filed on Jun. 4, 2012, entitled "IMPROVED LEARNING STOCHASTIC APPARATUS AND METHODS" each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates to machine learning apparatus and methods and more particularly, in some implementations, to computer apparatus and methods for implementing reinforcement learning rules in artificial neural networks.

2. Artificial Neural Networks

An artificial neural network (ANN) is a mathematical or computational model (which may be embodied for example in computer logic or other apparatus) that is inspired by the structure and/or functional aspects of biological neural networks. A neural network comprises a group of artificial neurons that are interconnected by synaptic connections. Typically, an ANN is an adaptive system that is configured to change its structure (e.g., the connection configuration and/or neural states) based on external or internal information that flows through the network during the learning phase.

Artificial neural networks are used to model complex relationships between inputs and outputs or to find patterns in data, where the dependency between the inputs and the outputs cannot be easily attained (Hertz J., Krogh A., and Palmer R. (1991) *Introduction to the Theory of Neural Networks*, Addison-Wesley, incorporated herein by reference in its entirety).

Artificial neural networks offer improved performance over conventional technologies in areas which include machine vision, pattern detection and pattern recognition, signal filtering, data segmentation, data compression, data mining, system identification and control, optimization and scheduling, complex mapping. For more details on applications of ANN see e.g. to Haykin, S., (1999), *Neural Networks: A Comprehensive Foundation* (Second Edition), Prentice-Hall or Fausett, L. V., (1994), *Fundamentals of Neural Networks: Architectures, Algorithms and Applications*, Prentice-Hall, each incorporated herein by reference in its entirety.

Neuron Models

An artificial neuron is a computational model inspired by natural, biological neurons. Biological neurons receive signals through specialized inputs called synapses. When the signals received are strong enough (surpass a certain threshold), the neuron is activated and emits a signal through its output. This signal might be sent to another synapse, and might activate other neurons. Signals transmitted between biological neurons are encoded in sequences of stereotypical short electrical impulses, called action potentials, pulses, or spikes.

Analog Neuron Models

The complexity of real neurons is highly abstracted when modeling artificial neurons. A schematic diagram of an artificial analog neuron is illustrated in FIG. 1A. The analog neuron 102 receives analog inputs via input connections 110 and produces an output signal y delivered via connection 108. The input connections are characterized by weights 104.

The model comprises a vector of inputs $106 \ x=[x_1, x_2, \ldots, x_n]^T$, a vector of weights $104 \ w=[w_1, \ldots, w_n]$ (weights define the strength of the respective signals), and a mathematical function which determines the activation of the neuron's output 108. The activation function may have various forms. In the simplest neuron models, the activation function is a linear function and the neuron output is calculated as:

$$y = wx \qquad \text{(Eqn. 1)}$$

More details on artificial neural networks can be found e.g. in Hertz et al. (1991), discussed supra.

Spiking Neuron Models

Models of artificial neurons typically perform signal transmission by using the rate of the action potentials for encoding information. Hence, signals transmitted in these ANN models typically have analog (floating-point) representation.

To the contrary, spiking neurons or spiking neural networks (SNN) represent a special class of ANN, where neuron models communicate by sequences of spikes (see Gerstner W. and Kistler W. (2002) *Spiking Neuron Models. Single Neurons, Populations, Plasticity*, Cambridge University Press, incorporated herein by reference in its entirety).

Most common spiking neuron models use the timing of spikes, rather than the specific shape of spikes, in order to encode neural information. A spike "train" can be described as follows:

$$S(t) = \Sigma_f \delta(t-t^f), \qquad \text{(Eqn. 2)}$$

where $f=1, 2, \ldots$ is the spike designator and $\delta(.)$ is the Dirac function with $\delta(t)=0$ for $t \neq 0$ and $$\int_{-\infty}^{\infty} \delta(t) dt = 1 \qquad \text{(Eqn. 3)}$$

Various spiking neuron models exist, such as, for example: Integrate-and-Fire (IF) and Leaky-Integrate-and-Fire (LIF), (see e.g., Stein, R. B., (1967). Some models of neural variability. *Biophys.* 1, 7: 37-68, incorporated herein by reference in its entirety). The dynamics of an exemplary LIF unit is described as follows:

$$C\frac{du(t)}{dt} = -\frac{1}{R}u(t) + [i_o(t) - \sum w_j i_j(t)] \quad \text{(Eqn. 4)}$$

where:
- u(t) is the model state variable (corresponding to the neural membrane potential of a biological neuron);
- C is the membrane capacitance;
- R is the input resistance;
- $i_o$(t) is the external current driving the neural state;
- $i_j$(t) is the input current from the j-th synaptic input; and
- $w_j$ represents the strength of the j-th synapse.

When the input resistance R→∞, Eqn. 3 describes the IF model. FIG. 1A illustrates one example of a typical neuron response to stimulation. In both IF and LIF models, a neuron is configured to fire a spike at time t', whenever the membrane potential u(t) (denoted by the traces 114, 128 in FIG. 1A) reaches a certain value υ, referred to as the firing threshold, denoted by the line 118 in FIG. 1A. Immediately after generating an output spike, the neuron state is reset to a new value $u_{res}$<υ, and the state is held at that level for a time interval representing the neural absolute refractory period. As illustrated in FIG. 1A, the extended stimulation of the node by the input signal 113 triggers multiple high excitability u(t) events within the node (as shown by the pulsing events 115 in FIG. 1A) that exceed the firing threshold 118. These events 115 result in the generation of the pulse train 116 by the node.

Most neural models may be characterized by a sub-threshold and super-threshold states. While sub-threshold stimulus typically only modifies the internal state of a neuron (e.g. increases the membrane potential), the super-threshold stimulus results in (i) a change of the internal state; and (ii) well as in the post-synaptic response by the neuron. That is, the super-threshold stimuli cause a neuron to generate output signals (action potentials, spikes) that can further be propagated to other neurons.

Biological neurons communicate with one another through specialized junctions called synapses (see Sherrington, C. S., (1897); The Central Nervous System. In: *A Textbook of Physiology*, 7th ed., part III, Ed. by Foster M. Macmillian and Co. Ltd., London, p. 929; Sutton R.S. (1988). Learning to predict by the methods of temporal differences. *Machine Learning* 3(1), 9-44; and Bennett, M. R., (1999), The early history of the synapse: from Plato to Sherrington. *Brain Res. Bull.*, 50(2): 95-118; each of the foregoing incorporated herein by reference in its entirety). Arrival of a pre-synaptic spike (illustrated by the spike train 120 in FIG. 1A) at a synapse provides an input signal i(t) into the post-synaptic neuron. This input signal corresponds to the synaptic electric current flowing into the biological neuron, and may be modeled as using an exponential function as follows:

$$i(t) = \int_0^\infty S_j(s-t)e^{-\frac{s}{\tau_s}}ds \quad \text{(Eqn. 5)}$$

where $\tau_s$ is the synaptic time constant, and S(t) denotes here a pre-synaptic spike train. A typical response of the synapse model given by Eqn. 5 to a sample input spike train 120 is illustrated by the curve labeled 123 in FIG. 1A. The neuron potential u(t) in response to the spike train 120 is depicted by the line 128 in FIG. 1A.

Similarly to the analog input, the spiking input 120 into a node triggers a synaptic input current, which in an exemplary implementation has a shape of a trace 123. The trace 128 depicts internal state of the node responsive to the synaptic input current 123. As shown in FIG. 1A, a single input pulse 122 of the pulse train 120 does not raise the node state above the firing threshold 118 and, hence, does not cause output spike generation. Pulse groups 124, 126 of the pulse train 120 cause the node state (excitability) to reach the firing threshold and result in the generation of output pulses 132, 134, respectively. A review of exemplary spiking neuron models is provided by Gerstner and Kistler 2002, incorporated by reference supra.

Spiking neural networks offer several benefits over other classes of ANN, including without limitation: greater information and memory capacity, richer repertoire of behaviors (including tonic/phasic spiking, bursting, spike latency, spike frequency adaptation, resonance, threshold variability, input accommodation and hi-stability), as well as efficient hardware implementations. In many models of ANN, it is assumed that weights comprise parameters that can be adapted. This process of adjusting the weights is commonly referred to as adaptation, "learning" or "training".

Reinforcement Learning Methods

In machine learning, reinforcement learning refers to the problem the goal of learning is explored via interactions between a learning agent and the environment. At each point in time t, the agent performs an action y_t and the environment generates an observation x_t and an instantaneous cost c_t, according to some (usually unknown) dynamics. The aim of the reinforcement learning is to discover a policy for selecting actions that minimizes some measure of a long-term cost; i.e., the expected cumulative cost. The environment's dynamics and the long-term cost for each policy are usually unknown, but can be estimated.

Most algorithms for reinforcement or reward-based learning in spiking neural networks are typically represented using the following general equation described, for example, by Fremaux, N. et al. (2010), Functional requirements for Reward-Modulated Spike-Timing-Dependent Plasticity, *J. of Neuroscience*, 30(4):13326-13337; Izhikevich, E. (2007), Solving the Distal Reward Problem through Linkage of STDP and Dopamine Signaling, *Cerebral Cortex*, 17, 2443-2452; and Legenstein, R., et al. (2008), A learning theory for reward-modulated spike-timing-dependent plasticity with application to biofeedback. *PLoS Computational Biology*, 4(10):1-27), each incorporated by reference here in its entirety:

$$\frac{d\theta_{ij}(t)}{dt} = \eta R(t) e_{ij}(t) \quad \text{(Eqn. 6)}$$

where:
- $\theta_{ji}$(t) is an adapted parameter of a synaptic connection between the pre-synaptic neuron i and the post-synaptic neuron j;
- η is a parameter referred to as the learning rate that scales the θ-changes enforced by learning, η can be a constant parameter or it can be a function of some other system parameters;
- R(t) is a function describing the reward signal;
- $e_{ji}$(t) is eligibility trace, configured to characterize correlation between pre-synaptic and post-synaptic activity.

Most existing learning algorithms based on Eqn. 6 may modify adaptive parameters θ only when the reward signal R(t) is nonzero, and both the pre-synaptic and the post-synaptic neurons are active. Accordingly, when either of these neurons is 'silent' (i.e., is not generating spikes), existing methods may provide no adaptations of the associated synaptic connections, according to existing art.

Based on the foregoing, there is a salient need for apparatus and method capable of efficient implementation of exploration (e.g., activation of silent neurons) during a learning process aimed at exploration of new possible solutions for the learning problem. This is a pertinent problem and unsatisfied need not only in the context of reinforcement learning, but also for supervised and unsupervised learning.

SUMMARY

The present disclosure satisfies the foregoing needs by providing, inter alia, apparatus and methods for implementing learning in artificial neural networks.

In one aspect of the invention, a method of operating computerized neuron is disclosed. In one implementation, the neuron is operable in accordance with a process characterized by a learning parameter, and the method includes modifying the learning parameter based at least in part on a reinforcement signal, and a quantity relating to a first adjustment and second adjustment. In one variant, the reinforcement signal is configured based at least in part on a performance measure determined based at least in part on a present performance and a target performance associated with the process.

In another variant, the quantity relating to the first and second adjustments comprises an aggregation of the first and second adjustments, and the first and the second adjustments are characterized by first and second eligibility traces, respectively.

In a second aspect of the invention, a controller apparatus is disclosed. In one implementation, the apparatus includes a storage medium, the storage medium having a plurality of instructions configured to, when executed, implement reinforcement learning in a neural network comprising a plurality of units. In one variant, the reinforcement learning is implemented by: evaluation of a network performance measure at first time instance; identification of at least one unit of the plurality of units, the identified at least one unit characterized by an activity characteristic meeting a criterion; and potentiation, based at least in part on the network performance measure being below a threshold, of the identified at least one unit. The potentiation is characterized by e.g., an increase in the activity characteristic.

In a third aspect of the invention, a method of adjusting an efficacy of a synaptic connection is disclosed. In one implementation, the connection is configured to provide input into a spiking neuron of a computerized spiking network, and the method includes, based at least in part on (i) a negative reward indication, and (ii) provision of the input to the neuron at a time, increasing the efficacy. In one variant, the provision of the input is characterized by an absence of neural output within a time window relative to the time.

In a fourth aspect of the invention, neural network logic is disclosed. In one implementation, the neural network logic comprises a series of computer program steps or instructions executed on a digital processor. In another implementation, the logic comprises hardware logic (e.g., embodied in an ASIC or FPGA).

In a fifth aspect of the invention, a computer readable apparatus is disclosed. In one implementation the apparatus comprises a storage medium having at least one computer program stored thereon. The program is configured to, when executed, implement reinforced learning within an artificial neural network.

In a sixth aspect of the invention, a system is disclosed. In one implementation, the system comprises an artificial neural (e.g., spiking) network having a plurality of nodes associated therewith, and a controlled apparatus (e.g., robotic or prosthetic apparatus).

In a seventh aspect, a robotic apparatus is disclosed. In one implementation, the apparatus comprises a plant (e.g., robotic mechanism or controlled device), and a neural network-based controller. In one variant, the controller is configured to implement reinforced learning so as to optimize one or more tasks of the apparatus over time.

In another variant, the robotic apparatus is configured according to the method including: identifying an undesirable result of an action of the plant of the robotic apparatus; and for the controller, performing at least one of: (i) penalizing at least one input source of a plurality of possible input sources that contributed to the undesirable result; and/or (ii) potentiating at least a portion of the possible input sources that did not contribute to the undesirable result.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1A:
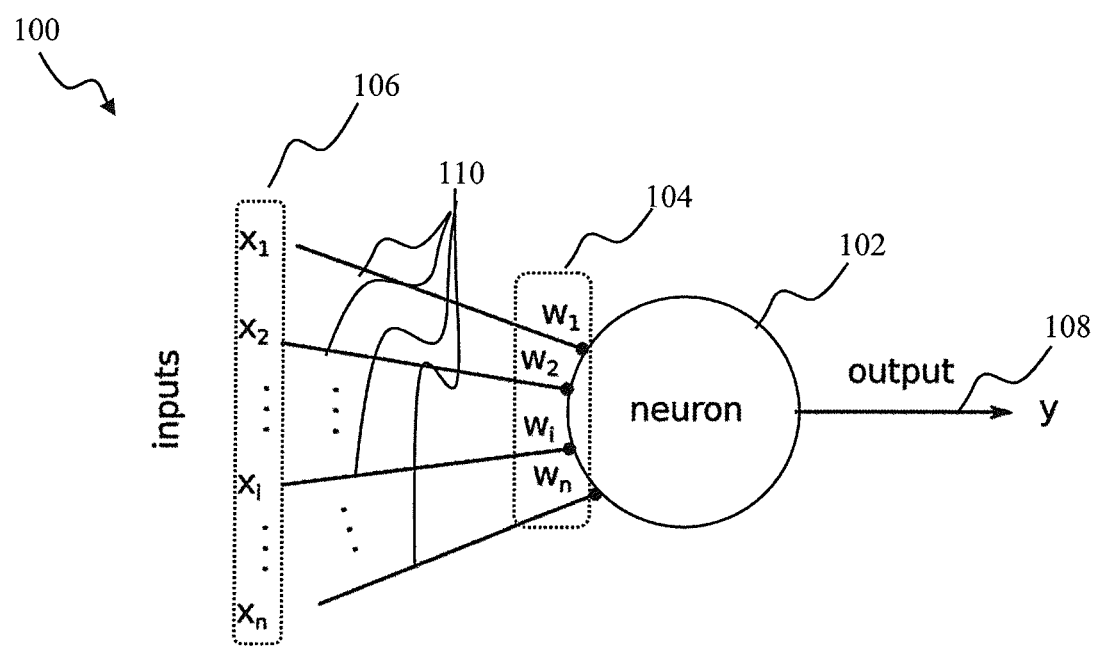
FIG. 1A is a block diagram illustrating a typical artificial neuron structure of the prior art.
Figure 1B:
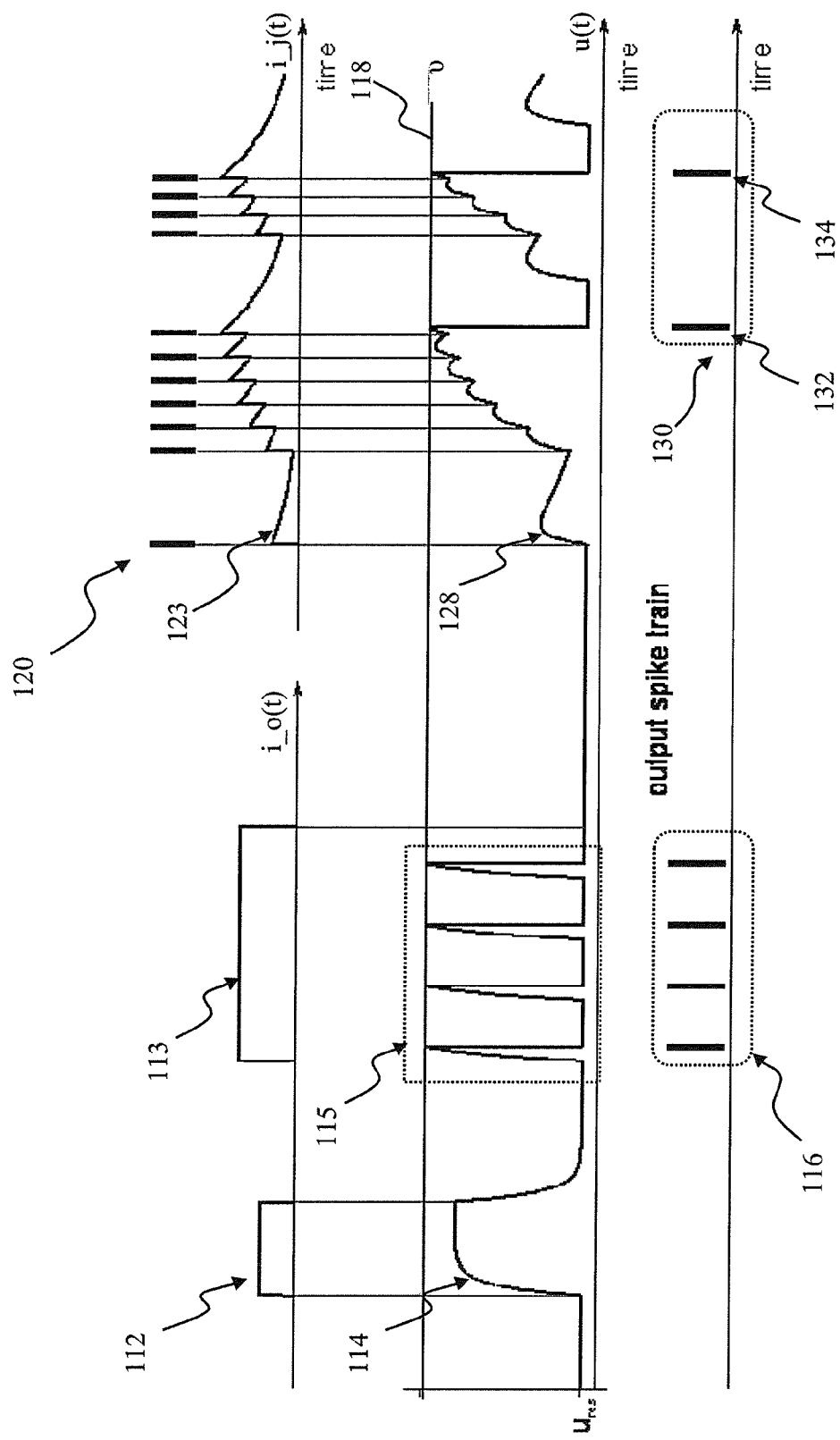
FIG. 1B is a plot illustrating input-output analog and spiking signal relationships of a spiking neuron model according to the prior art.

All Figures disclosed herein are © Copyright 2012 Brain Corporation. All rights reserved.

DETAILED DESCRIPTION

Implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs).

As used herein, the teens "processor", "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, or software interface with a component, network or process including, without limitation, those of the FireWire (e.g., FW400, FW900, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the tetras "node", "neuron", and "neural node" are meant to refer, without limitation, to a network unit (such as, for example, a spiking neuron and a set of synapses configured to provide input signals to the neuron), a having parameters that are subject to adaptation in accordance with a model.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

Overview

The present innovation provides, inter alia, apparatus and methods for implementing exploration during learning by artificial neural networks.

In exemplary implementations, the focused exploration is enacted by associative adaptation, comprising providing a negative reward signal to the network, which may cause increase of excitability of the neurons in combination with decrease in excitability of active neurons. In one or more implementations, the increase is gradual and of smaller magnitude, compared to the excitability decrease. In some implementations, the increase/decrease of the neuron excitability is effectuated by increasing/decreasing efficacy of the respective synaptic connections that are delivering presynaptic inputs into the neuron.

In some implementations, the focused exploration may be achieved by non-associative potentiation that is configured based at least in part on the input spike rate.

In one or more implementations, the non-associative potentiation may further comprise depression of connections that provide input in excess of a desired limit.

Reinforcement learning of the disclosure advantageously implements structured exploration, and enables participation by every neuron of the network in a search for an optimal solution within a shorter period of time. Focused exploration is implemented in response to a performance decrease, thereby avoiding disturbing correct solutions, and increasing the probability of arriving at an optimal solution in a shorter period of time as compared to the prior art, thus improving learning speed and convergence.

Adaptive Apparatus

Detailed descriptions of the various implementation of apparatus and methods of the disclosure are now provided. Although certain aspects of the disclosure can best be understood in the context of adaptive robotic control system comprising a spiking neural network, the innovation is not so limited, and implementations thereof may also be used for implementing a variety of learning systems, such as for example signal prediction (supervised learning), finance applications, data clustering (unsupervised learning), inventory control, and data mining, etc.

Implementations of the disclosure may be, for example, deployed in a hardware and/or software implementation of a neuromorphic computer system. In some implementations, a robotic system may include a processor embodied in an application specific integrated circuit (ASIC), which can be adapted or configured for use in an embedded application (such as for instance a prosthetic device).

Figure 2:
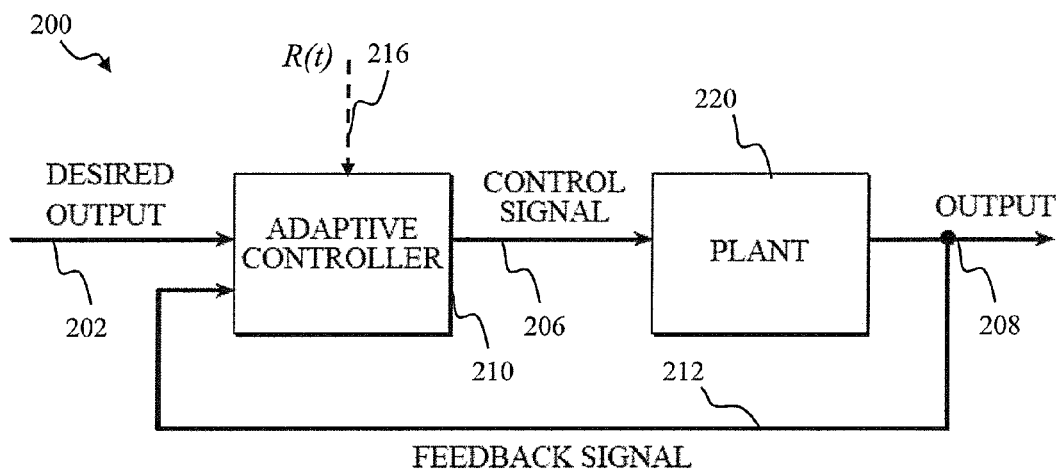
FIG. 2 is a block diagram illustrating an adaptive controller apparatus comprising an adaptive block configured to effectuate learning exploration, in accordance with one or more implementations.

FIG. 2 illustrates one exemplary learning apparatus useful to the disclosure. The apparatus 200 shown in FIG. 2 comprises adaptive controller block 210 (such as for example a computerized controller for a robotic arm) coupled to a plant (e.g., the robotic arm) 220. The adaptive controller is configured to control the plant 220 using a structured exploration-aided learning methodology described in detail below with respect to FIGS. 4-6. The control apparatus 200 may receive a desired output signal 202 $y^d(t)$ (desired plant output), which may correspond in some implementations to a directive to the apparatus 200 to accomplish a particular task (e.g., move robotic vehicle to a location A; or pick an object using the robotic arm at the location B, characterized, for example, by n-dimensional coordinates $B=[x_1, x_2, \ldots x_n]$). In some implementations, such as for example object recognition or signal classification, the desired signal 202 may correspond to the target object feature (shape, color, texture). In some implementations, such as for example financial system modeling, the desired output signal 202 may correspond to known target stock price or target interest rate.

The adaptive controller 210 may generate control signal u(t) 206 (comprising for example, motor actuator commands for the arm; vehicle speed/direction in a position tracking application; or heater power/fan speed in an HVAC application) that is based on the desired output signal 202. The signal $y^d(t)$ may cause the robotic arm to move along a trajectory towards the location A. Depending on particular implementation of the plant, the movement of the arm may be effected by the control signal u(t) provided to the plant. This trajectory is characterized by the output signal y(t) 208, corresponding, in some implementations, to the position of the arm at times t.

In some implementations, in order to assess and performance and aid to the operation of the adaptive controller 210 of FIG. 2, the output 208 of the plant is fed back to the controller 210 via pathway 212 and is combined with the desired output signal $y^d(t)$, according to a variety of closed-loop control implementations. Closed-loop control is well known in the art, and accordingly not described in detail herein for brevity.

As the precise dynamic model F of the plant of the apparatus 200 is typically not known in sufficient detail, the input reference signal 202 and the plant output 208 are used by the learning block 210 in order to adapt the controller parameters, using for example reinforcement learning methodology described below, in order to minimize the discrepancy between the signals 202 and 208, that is between the desired and actual plant output. The apparatus 200 may receive, in some implementations, a reinforcement signal R(t) 216 that is configured to aid this task.

Computerized Spiking Network

In one or more implementations, the adaptive controller 210 may comprise adaptive spiking neural network (e.g., the network 300 of FIG. 3) configured to implement a structured exploration-aided learning methodology of the disclosure. The network 300 comprises one or more spiking neurons 302 (also referred to as "units") interconnected by one or more connection 314. Neurons 302 and connections 314 may generally be referred to as units as well. Each of the unit-to-unit connections (e.g., 314) is assigned, inter alia, a connection efficacy (which in general refers to a magnitude and/or probability of influence of pre-synaptic spike to firing of post-synaptic neuron, and may comprise for example a parameter—synaptic weight—by which one or more state variables of a post-synaptic unit are changed). During operation of the pulse-code network (e.g., the network 300), synaptic weights may be dynamically adjusted using what is referred to as the spike-timing dependent plasticity (STDP) in order to implement, among other things, network learning.

One or more neurons (e.g., the neurons 322_1 in FIG. 3) are configured to receive the target signal 304 (e.g., the desired output signal $y^d(t)$ 202 of FIG. 2), while one or more neurons (e.g., the neuron 302_2 in FIG. 3) are configured to generate control signal u(t). The connections 304 may also be referred to as the feed forward connections configured to provide feed-forward input to neurons 302. The network 300 may also comprise feedback or context connections, 324 configured to provide neural feedback or context signal related to the feed-forward input, such as for example those described in detail in co-pending and co-owned U.S. patent application Ser. No. 13/645,924 filed May 7, 2012, entitled "SPIKING NEURAL NETWORK FEEDBACK APPARATUS AND METHODS", incorporated herein by reference in its entirety, although it will be recognized that other approaches may be used consistent with the exemplary implementations herein.

The target signal 304 is provided to the network 300 in order to facilitate, inter alia, training, and to cause the output control signal u(t) 308. The training method objectives comprise adjustment and modification of neural state(s) and/or synaptic parameters of the connections 314 in order to generate the output 308 that is consistent with the given input target signal 304.

In some implementations, spiking neurons 302 are operated according to a spiked model described, for example, by the Eqn. 4 (see also Gerstner W. and Kistler W., 2002, incorporated supra), and are configured to generate post-synaptic spikes (as described in, for example, U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety) which are propagated via feed-forward connections 314. Post-synaptic spike generation is well established in the spiking network arts, and accordingly will not be described in detail for brevity.

In some implementations, the connection parameter comprises connection weight w(t) describing, inter alia, relative importance of the signal associated with the connection to the destination neuron. In other implementations, the parameter comprises a delay, a destination unit ID, etc. Connection adjustment (potentiation/depression) may comprise adjustment of synaptic weights and/or synaptic delays, according to a variety of applicable synaptic rules, such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", incorporated by reference supra.

In some implementations, during neural state update, efficacy of synaptic connections delivering feed-forward input to the neuron is updated according, for example, to methodology describes in co-owned U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety. As described in one or more exemplary implementations of the above referenced application, one or more connection updates are accumulated over a period of time and updated in bulk to improve, inter alia, memory access efficiency.

In some implementations, the receptive field diversity in a neural network is increased by introducing competition among neurons according to methodology described in co-owned U.S. patent application Ser. No. 13/488,106, filed on Jun. 4, 2012, entitled "SPIKING NEURON NETWORK APPARATUS AND METHODS" and U.S. patent application Ser. No. 13/488,114, filed on Jun. 4, 2012, entitled "SPIKING NEURON NETWORK APPARATUS AND METHODS", each of which being previously incorporated by reference herein. As discussed therein, in order to enable different neurons to respond to different input features a heterosynaptic plasticity mechanism is implemented. The heterosynaptic plasticity is effectuated, in one or more implementations, using at least two different plasticity mechanisms: (i) one (regular) STDP mechanism for at least one first neuron that responds to a stimulus; and (ii) a different mechanism(s) for other neurons that may respond to the stimulus.

The network 300 may receive a reinforcement signal 316 to aid network operation (e.g., synaptic adaptation) by modifying its control parameters in order to improve the control rules so as to minimize, for example, performance measure associated with the controller performance. In some implementations, the reinforcement signal R(t) comprises two or more states:

(i) a base state (i.e., zero reinforcement, signified, for example, by absence of signal activity on the respective input channel, zero value in of register or variable etc.). The zero reinforcement state may correspond, for example, to periods when network activity has not arrived at an outcome, e.g., the robotic arm is moving towards the desired target; or when the performance of the system does not change or is precisely as predicted by the internal performance predictor (as for example described in co-owned U.S. patent application Ser. No. 13/238,932 filed Sep. 21, 2011, and entitled "ADAPTIVE CRITIC APPARATUS AND METHODS" incorporated supra); and (ii) first reinforcement state (i.e., positive reinforcement, signified for example by a positive amplitude pulse of voltage or current, binary flag value of one, a variable value of one, etc.). Positive reinforcement is provided when the network operates in accordance with the desired signal, e.g., the robotic arm has reached the desired target, or when the network performance is better than predicted by the performance predictor, as described for example in co-owned U.S. patent application Ser. No. 13/238,932, referenced supra.

In one or more implementations, the reinforcement signal may further comprise a third reinforcement state (i.e., negative reinforcement, signified, for example, by a negative amplitude pulse of voltage or current, a variable value of less than one (e.g., −1, 0.5, etc.). Negative reinforcement is provided when the network does not operate in accordance with the desired signal, e.g., the robotic arm has reached wrong target, and/or when the network performance is worse than predicted or required.

Figure 3:
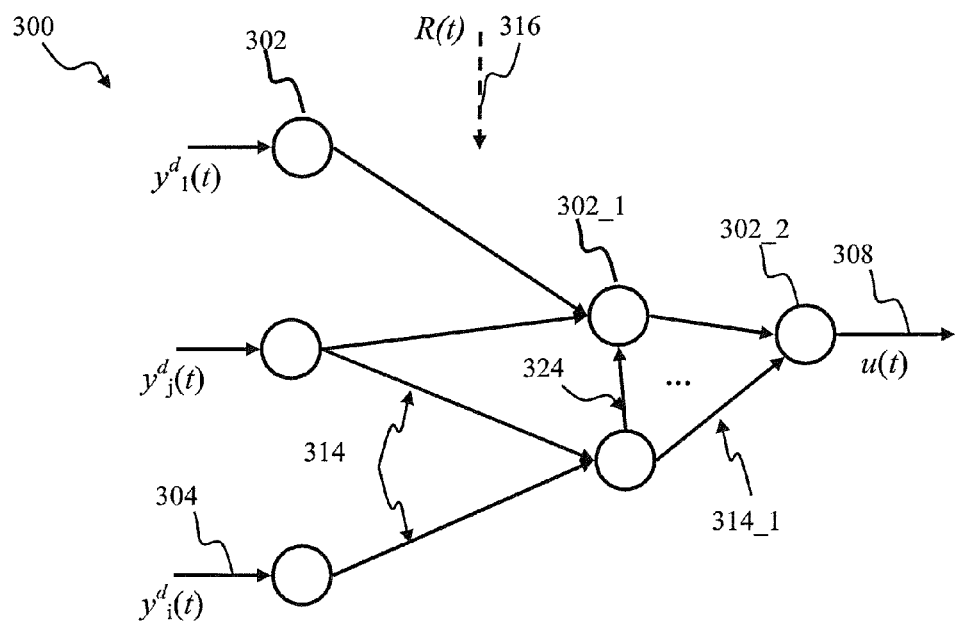
FIG. 3 is a graphical illustration depicting a neural network structure in accordance with one or more implementations.

It will be appreciated by those skilled in the arts that other reinforcement implementations may be used with the network 300 of FIG. 3, and/or apparatus 200 of FIG. 2, such as for example use of two different input channels to provide for positive and negative reinforcement indicators, a bi-state or tri-state logic, integer, or floating point register, etc.

Learning Methods
Reinforcement Learning via Focused Exploration

Operation of the exemplary network 300 comprising focused exploration reinforcement learning methodology is now described in detail with respect to FIGS. 4A-6. In one or more implementations, units 302, 314 of the network 300 may be operated in accordance with the reinforcement (or reward-based) learning model, configured as follows:

$$\frac{d\theta_j(t, a)}{dt} \propto R(t, a) \sum_k \eta_k(t, a) e(t, a) \qquad \text{(Eqn. 7)}$$

where α is a set of parameters that R, $\eta_k$ and $e_k$ are dependent upon.

Eqn. 7 generally describes that synaptic parameter $\theta_{ij}(t)$ characterizing an interaction of a neuron i and a neuron j, may be adjusted based on a linear combination of different adjustments contributions (each characterized by a separate learning rate $\eta_k$). The learning combination is further gated by the reinforcement signal R(t), that may be used as a logical (or algebraic switch) for controlling learning.

Exploration Via Associative Potentiation

In one or more implementations, the linear combination of Eqn. 7 may be configured as follows:

$$\frac{d\theta(t)}{dt} \propto R(t)[E1_{ij} + E2_{ij}]; E1_{ij} = \eta_1(t)e1_{ij}(t);$$

$$E2_{ij} = \eta_2(t)e2_{ij}(t),$$

(Eqn. 8)

where:
- $\eta_1(t)$ and $\eta_2(t)$ are the learning rates that may comprise a function of time and/or other parameters;
- $e1_{ij}(t)$ is the reward-modulated spike-timing-dependent plasticity eligibility trace; and
- $e2_{ij}(t)$ is the reward-modulated non-associative plasticity eligibility trace.

By way of background, an exemplary eligibility trace may comprise a temporary record of the occurrence of an event, such as visiting of a state or the taking of an action, or a receipt of pre-synaptic input. The trace marks the parameters associated with the event (e.g., the synaptic connection, pre- and post-synaptic neuron IDs) as eligible for undergoing learning changes. In one approach, when a reward signal occurs, only eligible states or actions are 'assigned credit' or 'blamed' for the error. Thus, the eligibility traces aid in bridging the gap between the events and the training information.

In some implementations, the eligibility trace $e1_{ij}(t)$ is configured based on a relationship between the input (provided by a pre-synaptic neuron i to a post-synaptic neuron j) and the output, generated by the neuron j), and may be expressed as follows:

$$e1_{ij}(t) = \int_0^\infty \gamma_2(t-t')g_i(t')S_j(t')dt',$$ (Eqn. 9)

where:

$$g_i(t) = \int_0^\infty \gamma_1(t-t')S_i(t')dt'.$$ (Eqn. 10)

In Eqn. 9 and Eqn. 10:
- $g_i(t)$ is the trace of the pre-synaptic activity $S_i(t)$;
- $S_j(t)$ is the post-synaptic activity; and
- $\gamma 1$ and $\gamma 2$ are the low-pass filter kernels.

In some implementations, the $\gamma 1$ and/or $\gamma 2$ kernels may comprise exponential low-pass filter (LPF) kernels, described for example by Fremaux et al. (2010), incorporated supra.

In some implementations, the eligibility trace $e2_{ij}(t)$ may be configured as follows:

$$\begin{cases} \text{if } R(t) < 0 & e2_{ij}(t) = -\int_0^\infty \gamma_3(t-t')S_i(t')dt' \\ \text{else: } & e2_{ij}(t) = 0 \end{cases}$$ (Eqn. 11)

where:
- the term $S_i(t)$ describes the input (e.g., pre-synaptic activity of a neuron i delivered by a synaptic connection into the neuron j); and
- $\gamma_3(t-t')$ comprises low-pass filter kernel, such as for example an exponential kernel, in one implementation.

The learning rule given by Eqn. 8 may be understood as follows:
(i) positive reinforcement ($R(t_0)>0$) at time $t_0$ indicates that the network operates in a desired state $S_p$, and hence that state is further reinforced. Accordingly, the units (i.e., the neurons and/or the synapses) that contribute to the state $S_p$, by, for example, having been active at the specified times $t_p$ prior to time $t_0$, should be potentiated (reinforced), as characterized by the term $\eta_1(t)e_1(t)$ in by Eqn. 8; and.
(ii) negative reinforcement signal ($R(t_0)<0$) at time $t_0$ indicates that the network operates in an undesired state $S_n$; accordingly, the units contributing to the state $S_n$ by, for example, having been active at the specified times prior to time $t_0$, should be penalized (depressed), as characterized by the term E1 in Eqn. 8. At the same time, efficacy of active synapses that are associated with inactive (i.e., sub-threshold) neurons, is increased (the units are potentiated), as characterized by the term E2 in Eqn. 8. It is noteworthy that potentiation, characterized by the term E2, is applied to active synapses (i.e., the synapses that provide pre-synaptic input into the neuron j). The contribution to the unit state due to the potentiation E2 of Eqn. 11 may increase probability of the sub-threshold units to transition to the super-threshold state (e.g., cause neurons to fire post-synaptic pulse). Such unit transition from the sub-threshold state to the super-threshold state may advantageously insert the previously inactive neurons into the operating neuron pool of the network. Accordingly, subsequent activity of these newly activated neurons may lead improved network operation, such as for example faster learning convergence, and/or lower residual errors due to additional exploration capability available to the network.

In some implementations, the eligibility trace adjustment E1 may be configured proportional to the value of the eligibility trace E2, at the time the adjustment to E1 is made, as described in more detail below with respect to FIG. 5A.

Figure 4A:
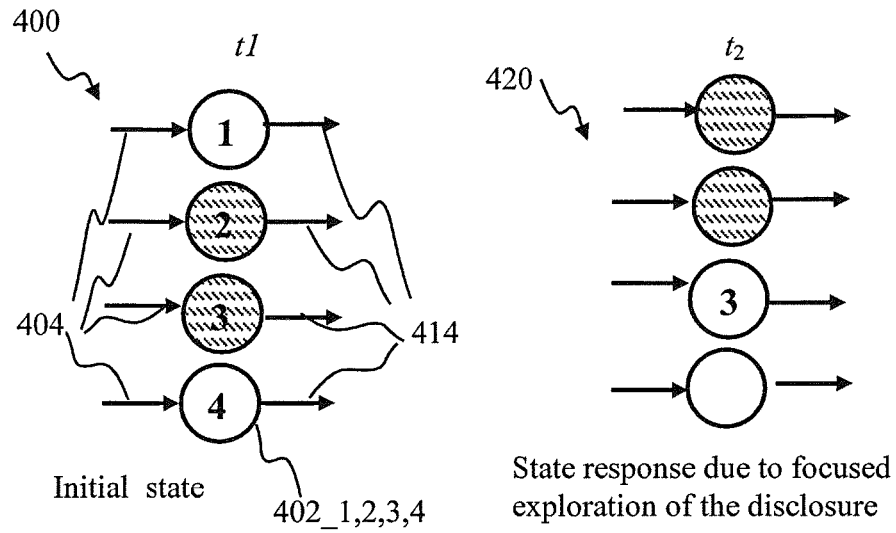
FIG. 4A is a graphical illustration depicting synaptic adaptation in a single input per neuron neural network in accordance with one or more implementations of structured exploration learning of the disclosure.
Figure 4A:
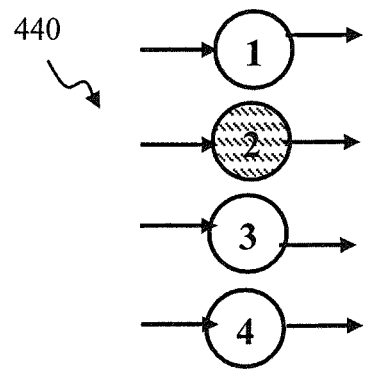

Panels 400, 420 in FIG. 4A illustrate neural network operating composing exploration methodology of Eqns. 9-10, as compared to exploration of prior art, shown in the panel 440 of FIG. 4A. The feed-forward network shown in FIG. 4A comprises four neurons 402, labeled 1, 2, 3, 4 respectively, each comprising an incoming connection, denoted 404, and an outgoing connection, denoted 414.

Figure 5:
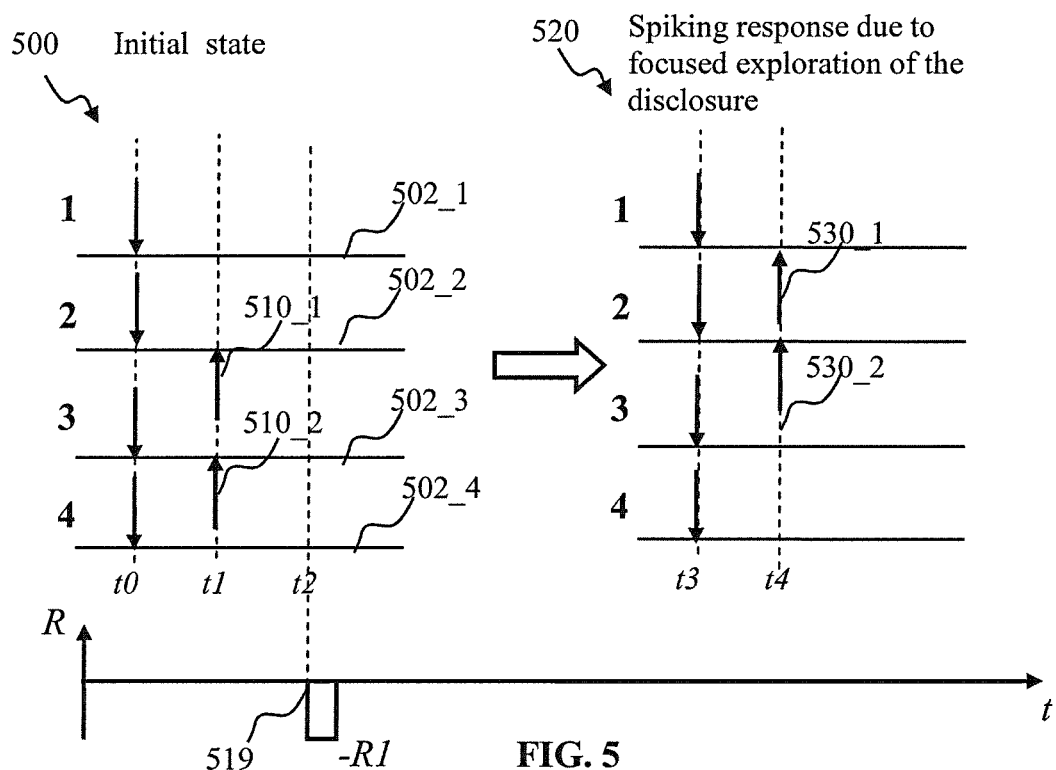
FIG. 5 is a graphical illustration depicting synaptic activity of the neural network of FIG. 4A in accordance with one or more implementations.

Spiking activity of the network of FIG. 4A is illustrated in FIG. 5. Pulse activity in the panels 500, 520 of FIG. 5 correspond to the network configuration shown in the panels 400, 420 of FIG. 4A, respectively. By way of illustration, at time $t_0$ all four neurons 402 of FIG. 4A may receive pre-synaptic pulses via the connections 404, as indicated by the downward arrows on traces 502_1, 502_2, 502_3, 502_4 in FIG. 5. States of the neurons 402 are adjusted in accordance with any applicable methodology, such as, for example, described in co-owned U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

Figure 6:
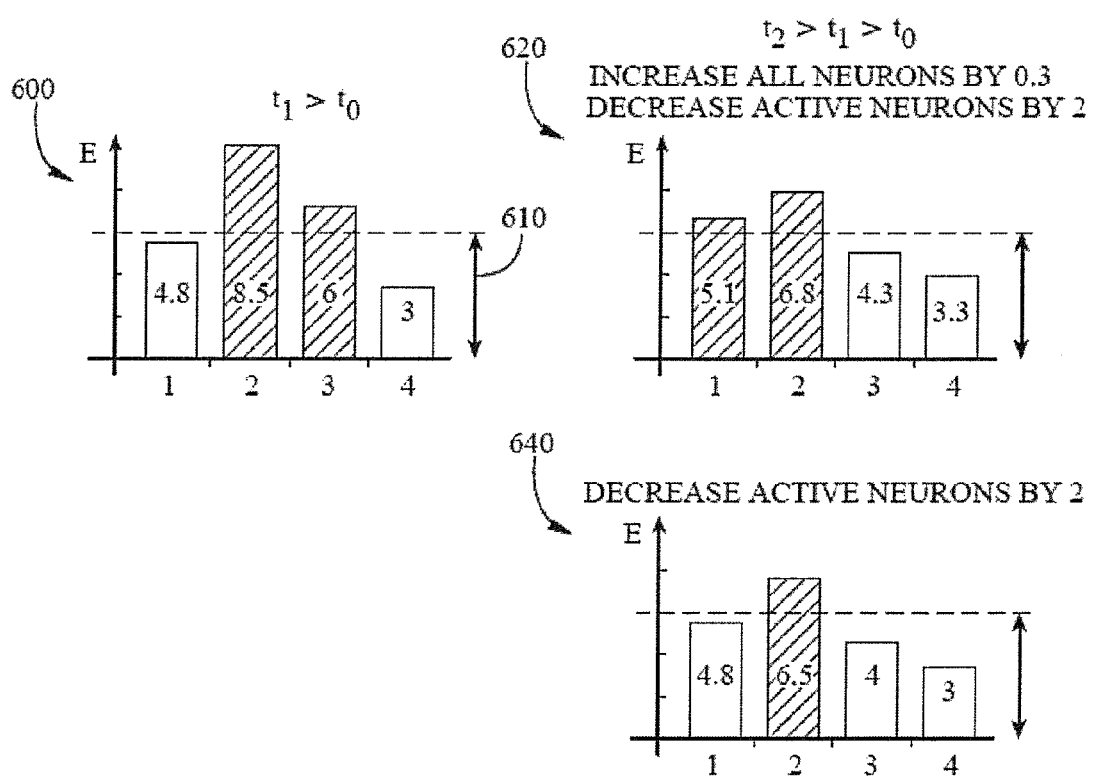
FIG. 6 is a graphical illustration depicting neural adaptation due to structured exploration in accordance with one or more implementations.

States of the neurons 402 are illustrated in FIG. 6, where panels 600, 620, correspond to the network configurations at times $t_1$, $t_2$, according to one implementation, shown in the panels 400, 420, of FIG. 4A, respectively. The states of the neurons 402 illustrated in the panel 640 of FIG. 6, correspond to the network configurations at time $t_1$, according to the prior art, shown in the panel 440, of FIG. 4A. By way of example, the neural states depicted in FIG. 6 comprise dynamic excitability characterized by a threshold 610 (also referred to as the firing threshold) and set to a value of 5 in the implementation of FIG. 6. The neurons comprising excitability that is below the threshold are referred to as the "sub-threshold", and the neurons having excitability that is at or above the threshold are referred to as the "super-threshold". It will be appreciated by those skilled in the arts, that other network implementations may be used with the focused exploration framework of the present disclosure, such as for example comprising stochastic neurons characterized by a probability of post-synaptic response ("probability of firing") generation. In such implementation, probability of firing of a neuron may for instance be compared to a predetermined value in order to discern if the neuron should generate a post-synaptic response (fire).

As shown in the panel 600 of FIG. 6, the excitability of the neurons 402_2, 402_3 of FIG. 4A, respectively, is above threshold (8.5, 6, respectively). Thus, the neurons 402_2, 402_3 of FIG. 4 may generate post-synaptic pulses at time $t_1 > t_0$, after receiving an excitatory input signal, as depicted by the upward arrows on traces 502_1, 502_2, 502_3, 502_4 in FIG. 5. Accordingly at time $t_1$, the network configuration shown in the panel 400 of FIG. 4A comprises two sub-threshold neurons (inactive neurons denoted '1', '4' and shown by open circles), and two super-threshold neurons (active neurons denoted by hashed circles labeled '2', '3').

At time $t_2 > t_1$, based at least on the generated pulses 510_1, 510_2, the network may receive negative reinforcement signal, as indicated by the negative pulse 519 of amplitude—$R_1$ in FIG. 5. Accordingly, the dynamic states of the neurons 402 of panel 420 in FIG. 4A are in the example implementation adjusted in accordance with Eqn. 8 as follows:
  (i) excitability of active neurons 402_2, 402_3 is reduced by 2.0, thereby producing excitability of 6.5 and 4, respectively; and
  (ii) excitability of all neurons 402_1, 402_2, 402_3, 402_4 is increased by 0.3 producing the following values, respectively: 5.1, 6.8, 4.3, and 3.3, as depicted by the bars denoted '1', '2', '3', '4', respectively, in panel 620 of FIG. 6.

The parameters of Eqn. 8 are configured as follows in this implementation: the term E1=−2, and the term E2=0.3. As a result of the above adjustment, the neurons 402_1, 402_3 may become active and generate post-synaptic pulses (illustrated by the upward arrows 530_1, 530_2 in the panel 520 of FIG. 5) at time $t_4 > t_2$ in response, for example, to receipt of pre-synaptic pulses (illustrated by the downward arrows in the panel 520 of FIG. 5).

Neuron excitability shown in the panel 620 of FIG. 6 indicates that at time $t_2$, the network configuration 420 of FIG. 4A is different from the initial configuration at time $t_i$ (shown in the panel 400 of FIG. 4A). Specifically, while both configurations 400, 420 comprise two super-threshold and two sub-threshold neurons, shown by hashed and open circles, respectively in FIG. 4A, the neurons denoted '1', '2', in the panel 420 are advantageously active, contrasted with the neurons '2', '3', of the panel 400. The newly active neuron '1' comprises a new network resource that is the result of the focused exploration, and may be used to seek different adaptive control solutions, or for other purposes.

Contrast the network configuration of the panel 420 of FIG. 4A, obtained through the focused exploration of the disclosure, with the configuration shown in the panel 440 of FIG. 4A, obtained using traditional approaches. As the traditional approaches do not reward (potentiate) inactive neurons when reinforcement is negative (i.e., the term $E_2$ of Eqn. 8 is zero), the neural state adjustment, performed for example in accordance with Eqn. 6 herein, produces neural states (illustrated in the panel 640 of FIG. 6), and a network configuration (illustrated in the panel 440 of FIG. 4A). The network adjusted according to the prior art comprises a single active neuron (e.g., the neuron 402_2 shown in the panel 440) having super-threshold state associated therewith, e.g., the excitability of the neuron above the threshold 610 in FIG. 6. As the neuron 402_2 has been previously active at time t1, the network configuration shown in the panel 440 does not comprise any new resources, and hence may not be capable of exploring different control solutions.

Figure 4B:
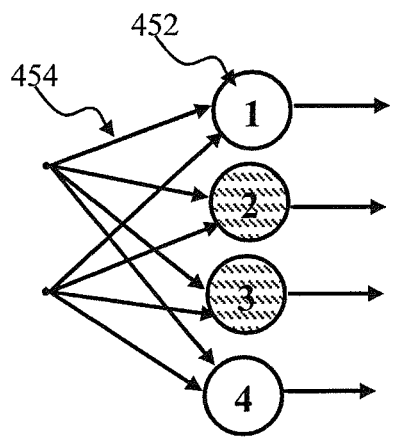
FIG. 4B is a graphical illustration depicting synaptic adaptation in a mixed input per neuron neural network in accordance with one or more implementations of structured exploration learning of the disclosure.

It will be appreciated by those skilled in the art that the one-to-one feed forward network architecture illustrated in FIG. 4A comprises just one possible implementation, and other configurations (e.g., comprising one to many, many to one, feedback, lateral context, etc.) are equally applicable and useful with the various aspects of the present disclosure. One such other implementation is illustrated in FIG. 4B, where each of neurons 452 (denoted with numerals 1, 2, 3, 4) may receive more than one inputs 454.

Figure 5A:
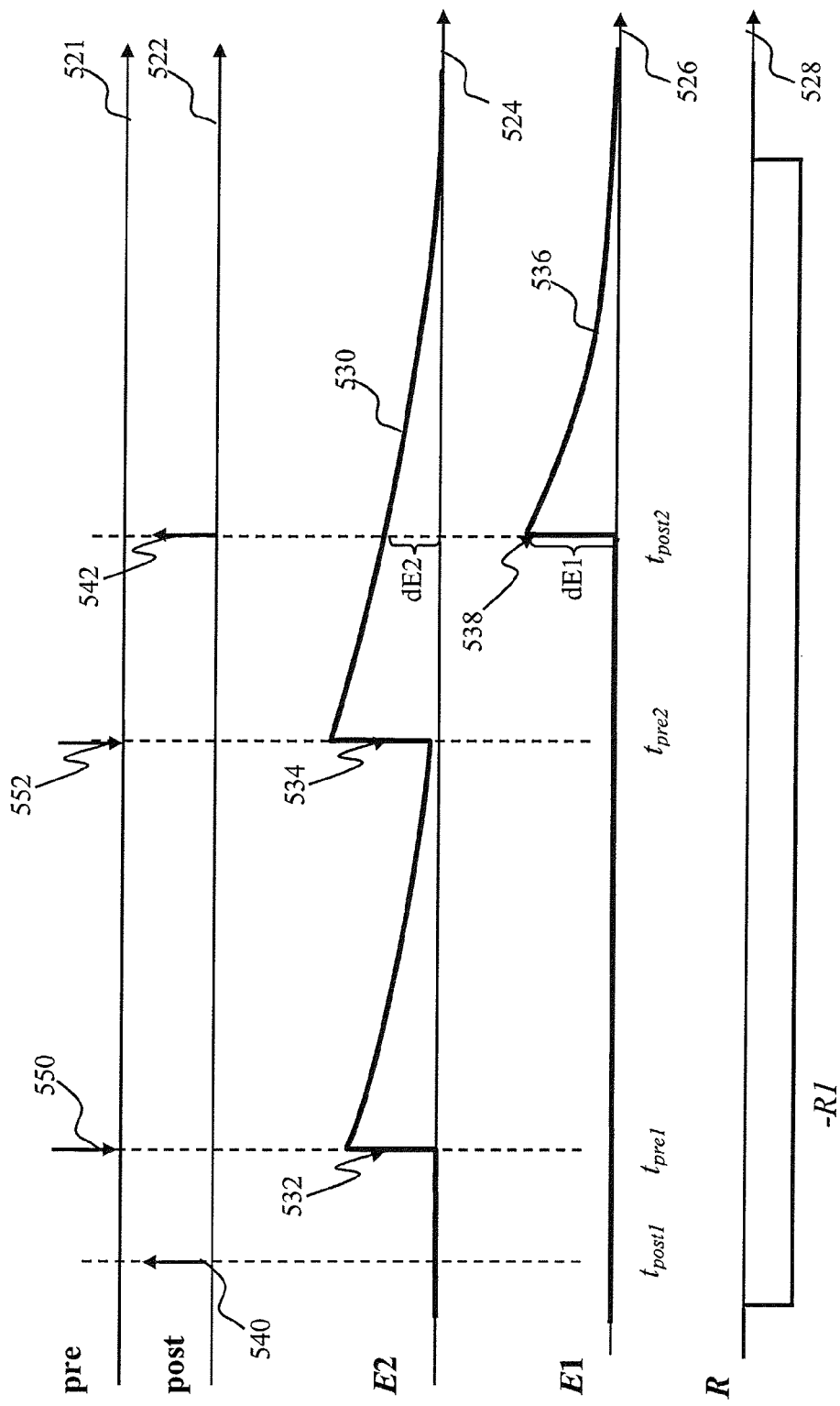
FIG. 5A is a graphical illustration depicting eligibility trace evolution with time in response to pre-synaptic and post-synaptic activity of the network of FIG. 4A, in accordance with one or more implementations.

FIG. 5A illustrates an exemplary eligibility trace evolution of a synaptic connection in response to pre-synaptic and post-synaptic activity. In FIG. 5A, the trace 521 denotes input from a pre-synaptic neuron delivered via a connection (e.g., the connection 404 in FIG. 4A) to a post-synaptic neuron (e.g., the neuron 402 in FIG. 4A); the trace 522 denotes output of the post-synaptic neuron; the trace 524 depicts time-evolution of the eligibility trace E2 of the connection in accordance, for example, with Eqn. 11. The trace 526 depicts time-evolution of the eligibility trace E1 of the connection in accordance, for example, with Eqn. 9-Eqn. 11 and the trace 528 depicts the reward signal R, which shows negative reinforcement. The reward R is configured as negative throughout entire time window of FIG. 5A, corresponding to the network not producing the desired output (for example, when the robotic manipulator progressing towards a wrong target and/or at an inappropriate speed/orientation).

As shown in the exemplary realization of FIG. 5A, at time $t_{post1}$, the post-synaptic neuron (e.g., the neuron 402_2 in FIG. 4A) generates a response depicted by the pulse 540 in FIG. 5A. As the reward is negative and the eligibility trace E2 is zero at time $t_{post1}$, the post-synaptic response of the neuron is not rewarded, and the eligibility trace E1 is not adjusted responsive to the pulses 540. At time $t_{pre1}$, the pre-synaptic input 550 is delivered via the connection. The negative reward R facilitates exploration by, inter alia, increasing the efficacy of the connection by potentiating the eligibility trace E2, as depicted by the step 532 in the curve 530 at time $t_{pre1}$ in FIG. 5A. In the implementation shown in FIG. 5A, the eligibility traces 530, 536 are configured to decay with time, in accordance with, for example, an exponential low-pass filter kernel; it will be appreciated, however, that other behaviors and/or decay models may be used consistent with the present invention. At time $t_{pre2}$, in response to another pre-synaptic input 552, the efficacy term E2 of the connection is increased, as depicted by the step 534 in the curve 530 at time $t_{pre2}$ in FIG. 5A. It is noteworthy that as the value of E2 at time $t_{pre2} > 0$, and the magnitude of the adjustments 534, 532 is the same, the magnitude of the E2 trace at time $E2(t_{pre2})$ is greater than that at time $t_{pre1}$: $E2(t_{pre2}) > E2(t_{pre1})$. When, at time $t_{post2}$, the post-synaptic neuron generates a response depicted by the pulse 542 in FIG. 5A, the eligibility trace E1 is adjusted responsive to the pulse 542. The adjustment to E1, denoted by the bracket ΔE1 in FIG. 5A, is configured proportional to the value of the eligibility trace E2 (denoted by the bracket dE2 in FIG. 5A), at time $t_{post2}$ so that:

$$\Delta E1|_{ti} \propto \Delta E2|_{ti}, \quad \text{(Eqn. 12)}$$

Exploration via Reward-independent Potentiation

In one or more implementations, the linear combination of Eqn. 7 may be configured as follows:

$$\frac{d\theta_{ij}(t)}{dt} \propto R(t)E1_{ij} + E3_{ij}; E1_{ij} = \eta_1(t)e1_{ij}(t); \quad \text{(Eqn. 13)}$$
$$E3_{ij} = \eta_3(t)e3_{ij}(t),$$

where:
- $\eta_1(t)$ and $\eta_3(t)$ are the learning rates that may comprise a function of time and/or other parameters;
- $e1_{ij}(t)$ is the reward-modulated spike-timing-dependent plasticity eligibility trace, configured according to Eqn. 9 and Eqn. 10; and
- $e3_{ij}(t)$ is the reward-independent non-associative plasticity eligibility trace.

In one or more implementations, the eligibility traces $e3_{ij}(t)$ of the adaptation rule Eqn. 13 may be expressed as:

$$e3_{ij}(t) = \int_0^\infty \gamma_4(t-t')S_i(t')dt', \quad \text{(Eqn. 14)}$$

where:
- the term $S_i(t)$ describes the input (e.g., pre-synaptic activity of a neuron i delivered by a synaptic connection into the neuron j); and
- $\gamma_4(t-t')$ comprises low-pass filter kernel, such as for example an exponential kernel, in one implementation.

The exploration rule of Eqn. 14 may be used to implement input potentiation that is proportional to the input activity to the neuron, independent of the reinforcement signal R(t,a), as seen from Eqn. 13. The rule of Eqn. 14 may lead to 'always-on' exploration and may speed-up the learning, particularly when negative reinforcement signal is not defined and/or used. In addition, the methodology of Eqn. 14 is computationally less expensive, when compared to the rule of Eqn. 11, as Eqn. 14 does not contain the conditional block.

In some implementations, the eligibility traces $e3_{ij}(t)$ of the aggregate adaptation rule of Eqn. 7 may be further expressed as:

$$e4_{ij}(t) = \int_0^\infty (\gamma_5(t-t')S_i(t') - D\gamma_6(t-t')S_j(t'))dt' \quad \text{(Eqn. 15)}$$

where:
- the term $S_i(t)$ describes the input (e.g., pre-synaptic activity of a neuron i delivered by a synaptic connection into the neuron j);
- $S_j(t)$ comprises the post-synaptic activity;
- $\gamma_5(t-t')$ and $\gamma_6(t-t')$ comprise low-pass filter kernels, such as for example an exponential kernel, in one implementation; and
- D comprises the depression coefficient.

The exploration rule of Eqn. 15 may be used to implement (i) input potentiation that is proportional to the input activity into the neuron; and (ii) depression that is proportional to the output activity of the neuron, independent of the reinforcement signal R(t,a). By way of illustration, when the output activity (firing rate) of the neuron is higher than desired limit, the input connections into the neuron may be depressed, as stipulated by the depression coefficient D. This learning rule may introduce homeostasis mechanism that keeps output firing rate in certain bounds.

Generalized Adaptation Methods

Figure 7A:
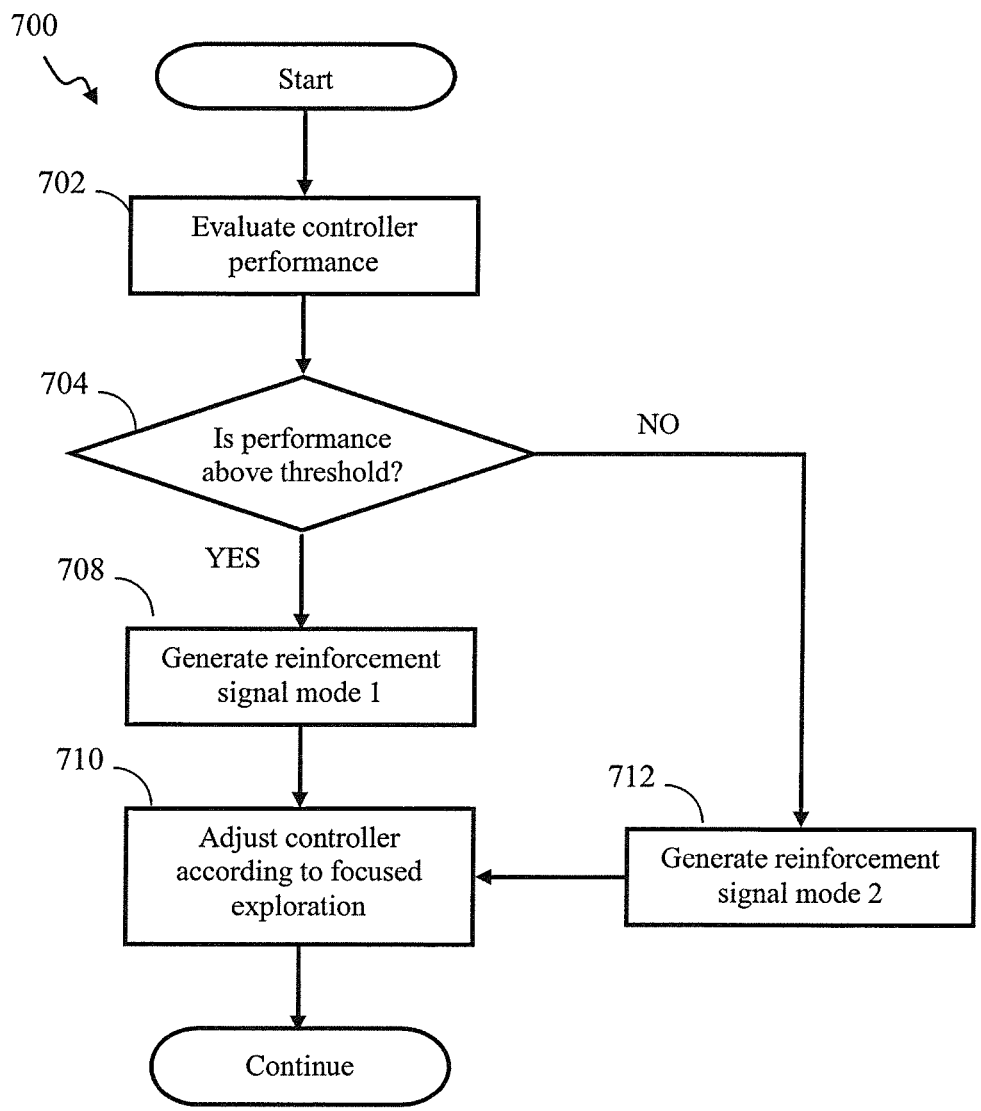
FIG. 7A is a logical flow diagram illustrating a generalized method of reinforcement signal generation in accordance with one or more implementations.

FIG. 7A illustrates one example of a generalized method of generating reinforcement signal for use with, for example, adaptive apparatus of FIG. 2, and/or neural networks of FIG. 3, 4A-4B, described supra.

At step 702 of the method 700, performance of the adaptive controller (or the adaptive network) is evaluated using any of a number of applicable methodologies. In some implementations, the performance evaluation may comprise interpolating performance measure history, as described in detail in co-owned U.S. patent application Ser. No. 13/238,932 filed Sep. 21, 2011, and entitled "ADAPTIVE CRITIC APPARATUS AND METHODS", U.S. patent application Ser. No. 13/313,826, filed Dec. 7, 2011, incorporated by reference supra. In one or more implementations, the performance evaluation may comprise the use of averaged error of a stochastic neural network, as described in detail in co-owned U.S. patent application Ser. No. 13/487,499, filed Jun. 4, 2012, and entitled "APPARATUS AND METHODS FOR IMPLEMENTING GENERALIZED PROBABILISTIC LEARNING RULES", previously incorporated by reference herein. In some implementations the performance evaluation may be based on a difference between the desired signal $y^d(t)$ and the actual plant output y(t) (e.g., as illustrated by the signals 202, 208 in FIG. 2, respectively).

At step 704, the performance measure is compared to a criterion (e.g., a threshold describing a minimum acceptable level of controller performance). In some implementations, the threshold may correspond to maximum deviation from control trajectory, as expressed for example by maximum position error of a robotic manipulator, or by a deviation from the desired template in recognition tasks.

In some implementations, steps 702, 704 of the method 700 may be performed by a trainer external to the controller apparatus (e.g., an operator providing reinforcement signal during recognition/classification tasks).

If the performance is above the threshold, a mode 1 reinforcement signal may be generated at step 708. If the performance is below the threshold, a mode 2 reinforcement signal may be generated at step 712. In some implementations, the mode 1, 2 signals may correspond to the positive and negative reinforcement, respectively. In some implementations, the mode 1 signal may not be generated, and only mode 2 signal (e.g., negative reinforcement) may be generated. In some implementations, the mode 2 signal may not be generated, and only mode 1 signal (e.g., positive reinforcement) may be generated.

At step 710 controller operation may be adapted in accordance with focused exploration, as for example that described with respect to FIGS. 4A-6 supra.

Figure 7B:
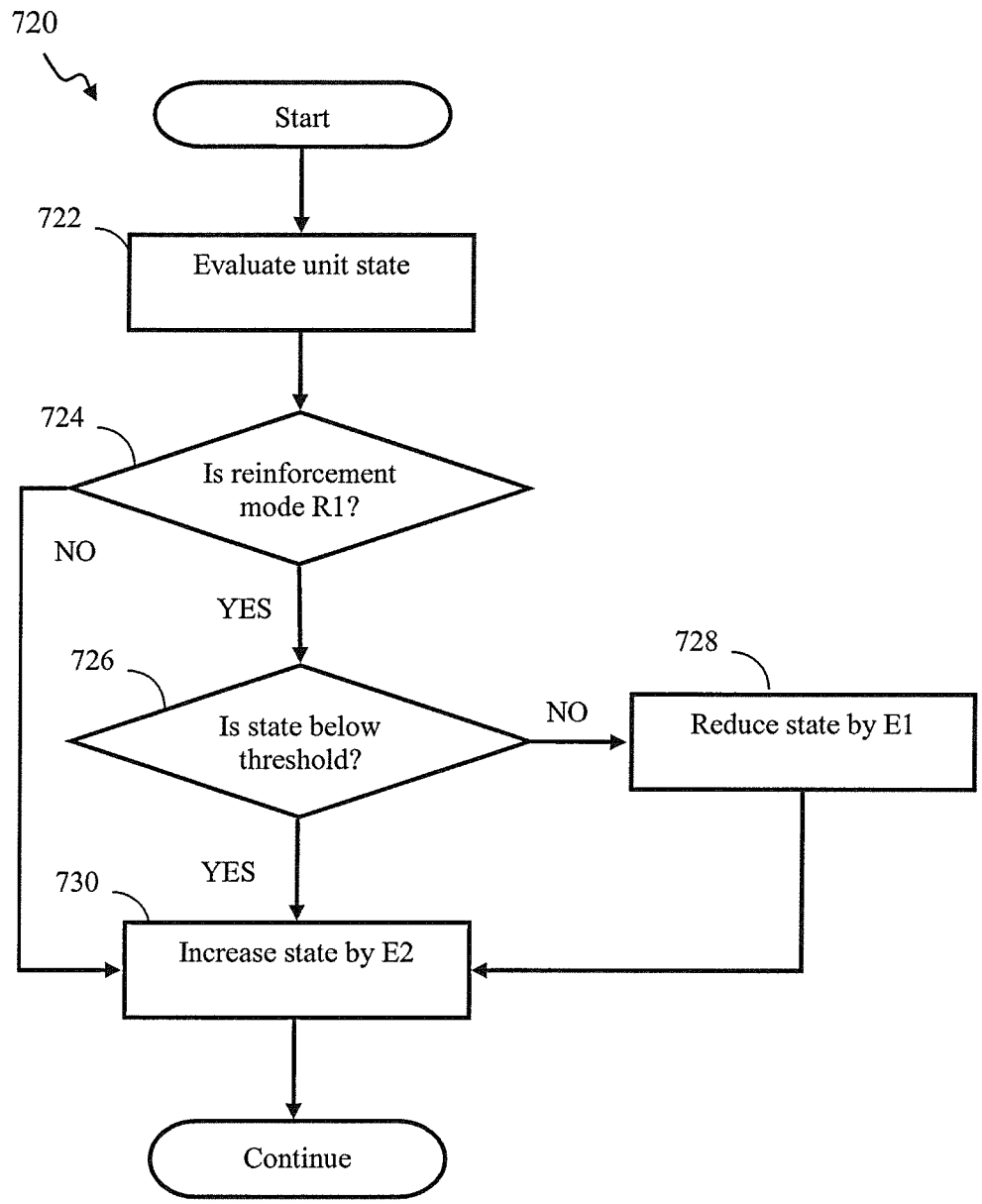
FIG. 7B is a logical flow diagram illustrating a generalized method of unit state adjustment in accordance with one or more implementations.

In some implementations, the controller may comprise neural network (e.g., the network 300 of FIG. 3 and/or networks shown in FIGS. 4A-4B), and controller operation adaptation may comprise adjustment of units (e.g., neurons and connections) of the network as described with respect to FIG. 7B.

At step 722 of the method 720 of FIG. 7B, state of the unit (e.g., neuron 402 of FIG. 4A) may be evaluated in response, for example, to pre-synaptic activity in connections 404.

At step 724, mode of the reinforcement signal (e.g., positive or negative reinforcement associated with the performance of the controller, such as that described with respect to FIG. 7A) is assessed in order to, for example, evaluate expression of Eqn. 11. In some implementations, the reinforcement mode R1 may be associated with the present performance being below the desired performance threshold or otherwise not meeting a prescribed criterion (or set of criteria).

At step 726, the unit state, from step 722, is compared to a threshold (e.g., the firing threshold 610 of FIG. 6).

If the state is at or above threshold (i.e., the unit has been active within a time window prior to receipt of reinforcement signal), the method proceeds to step 728, where the state of active units is depressed by an amount E1. In one or more implementations, the state adjustment E1 may be derived using Eqn. 10 as $E1=\eta_1(t)e_1(t)$.

At step 730, the state of sub-threshold and super-threshold (e.g., active and inactive) units is increased by an amount E2. In one or more implementations, the state adjustment E2 may be derived using Eqn. 10 as: $E2=\eta_2(t)e_2(t)$.

Connection Adjustment by Focused Exploration

Figure 7C:
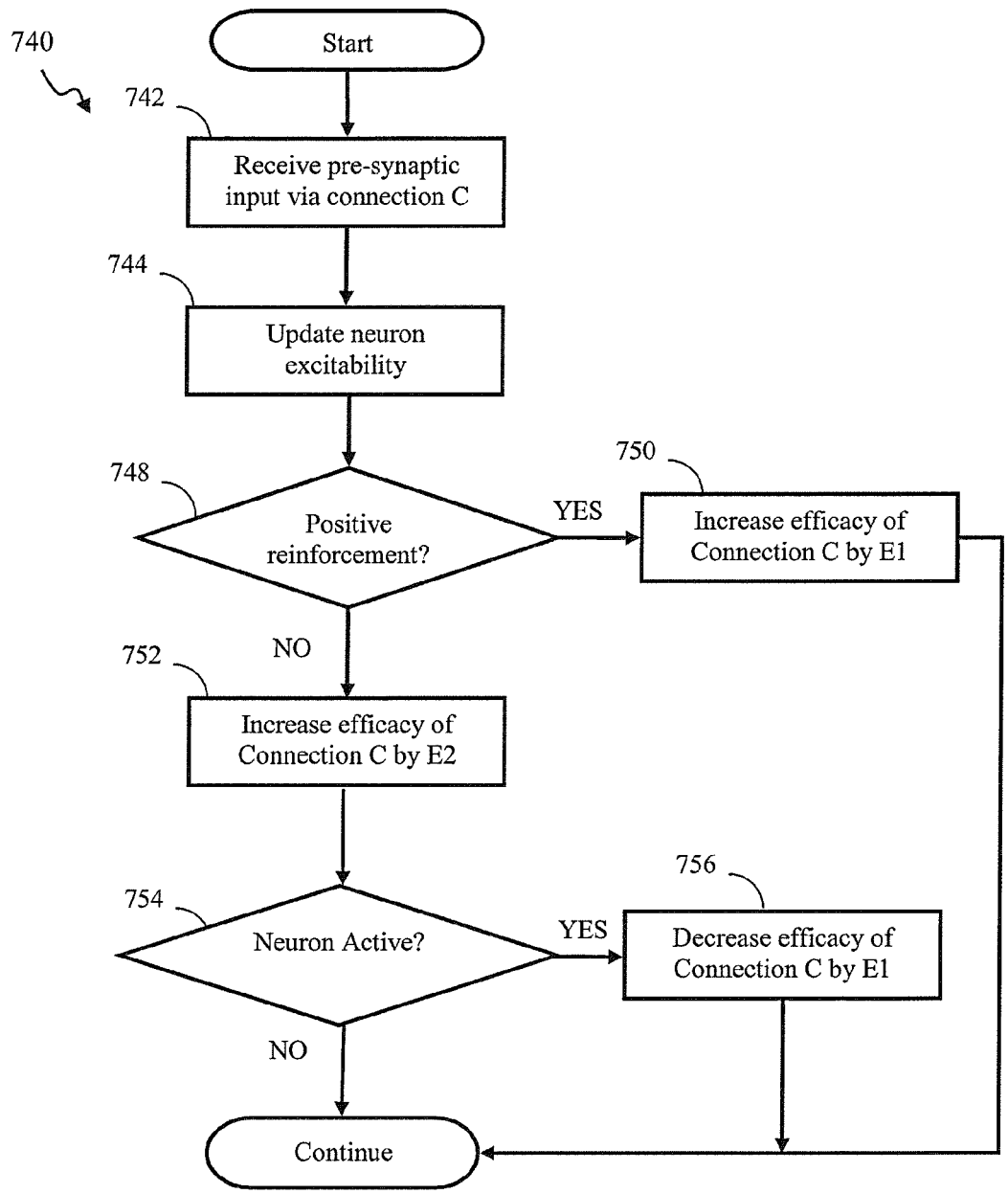
FIG. 7C is a logical flow diagram illustrating a generalized method of synaptic connection efficacy adjustment in accordance with one or more implementations.

Focused exploration methodology, such as for example that described with respect to FIG. 7B, supra, may be applied to synaptic connections of the neural network (e.g., the connection 304, 314 of FIG. 3), as shown and described with respect to FIG. 7C.

At step 742 of the method 740 of FIG. 7C, pre-synaptic input is transmitted via a connection C, such as, e.g., the pulse 502_1 of FIG. 5 transmitted via the connection 404 to the neuron 402 of FIG. 4B).

At step 744, neural excitability is adjusted in accordance with the pre-synaptic input using any of the applicable methodologies described herein. As a result of the excitability update, the neuron may generate a post-synaptic response.

At step 748, the mode of the reinforcement signal/reward indicator (e.g., none, positive, or negative reinforcement, as described with respect to FIG. 7A) is assessed in order to, for example, evaluate the expression of Eqn. 11.

If the reinforcement is positive, at step 750, the connection C efficacy may be increased by an amount E1 (connection C potentiated), using for example spike-timing dependent plasticity rules such as for example those described in co-owned U.S. patent application Ser. No. 13/152,105 filed on Jun. 2, 2011, and entitled "APPARATUS AND METHODS FOR TEMPORALLY PROXIMATE OBJECT RECOGNITION", and U.S. patent application Ser. No. 13/465,924 filed on May 7, 2012, and entitled "SPIKING NEURAL NETWORK FEEDBACK APPARATUS AND METHODS", each of the foregoing incorporated herein by reference in its entirety.

If the reinforcement is negative, at step 752, the connection C efficacy may be increased (the connection C potentiated) by amount E2. In one or more implementations, at step 752 all of the connection delivering presynaptic input into the neuron may be potentiated by amount E2 as well. In one or more implementations, the state adjustment E2 may be derived using Eqn. 10 as: $E2=\eta_2(t)e_2(t)$.

At step 754, if the neuron generated post-synaptic response at step 744 and the reward indication is negative, the efficacy of the connection C is reduced by an amount E1, at step 756. In one or more implementations, the state adjustment E1 may be derived using Eqn. 10 as: $E_1=\eta_1(t)e_1(t)$.

In some implementations, individual contributions $g_i(t)$ from multiple synapse inputs (connections) to the overall excitability of the neuron $g(t)$ are added as follows:

$$g(t)=\Sigma_i g_i(t) \quad \text{(Eqn. 16)}$$

Hence connection potentiation/depression at steps 750, 752, 756 of the method 740 may increase/decrease neuron excitability, respectively.

In some implementations of the method of FIG. 7C, the connection efficacy may comprise connection strength (or weight). Connection efficacy may comprise for example transmission probability.

In some implementations of the disclosure, focused exploration may comprise adaptation of neural state characteristic, such as for example intrinsic parameters (intrinsic plasticity), or firing threshold.

Online Vs. Offline Learning

During learning, model and node network parameter updates may be effectuated, in one implementation, upon receiving and processing a particular input by the node (and prior to receipt of a subsequent input). This update mode is commonly referred to as "online-learning". In another implementation, parameter updates are computed, buffered, and implemented at once in accordance with an event. In one variant, such event corresponds to a trigger generated upon receipt of a particular number (a pre-selected or dynamically configured) of inputs. In another variant, the event is generated by a timer. In yet another variant, the event is generated externally. Such mode of network operation is commonly referred to as "batch learning".

Performance Results

Figure 8:
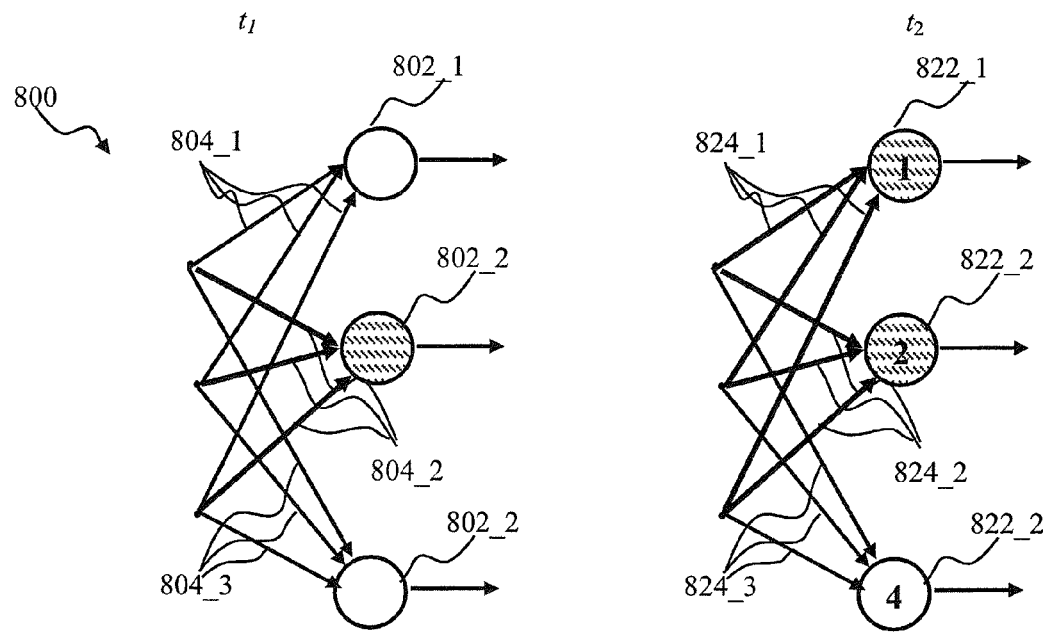
FIG. 8 is a graphical illustration depicting adaptation in a multiple input neural network in accordance with one or more implementations.

Referring now to FIG. 8, one implementation of spiking network apparatus for effectuating the focused exploration framework of the disclosure is shown and described in detail. The network 800 may comprise one or more stochastic or deterministic spiking neurons 802, operable according to for example a Spike Response Model, and configured to receive n-dimensional input spiking stream. $X(t)$ via n-input connections 804. In some implementations, the n-dimensional spike stream may correspond to n-input synaptic connections into the neuron. Individual input connections may be characterized by a connection parameter $w_{ij}$ that is configured to be adjusted during learning. In one or more implementations, the connection parameter may comprise connection efficacy (e.g., weight). The parameter $w_{ij}$ may also comprise synaptic delays, or probabilities of synaptic transmission.

Figure 9:
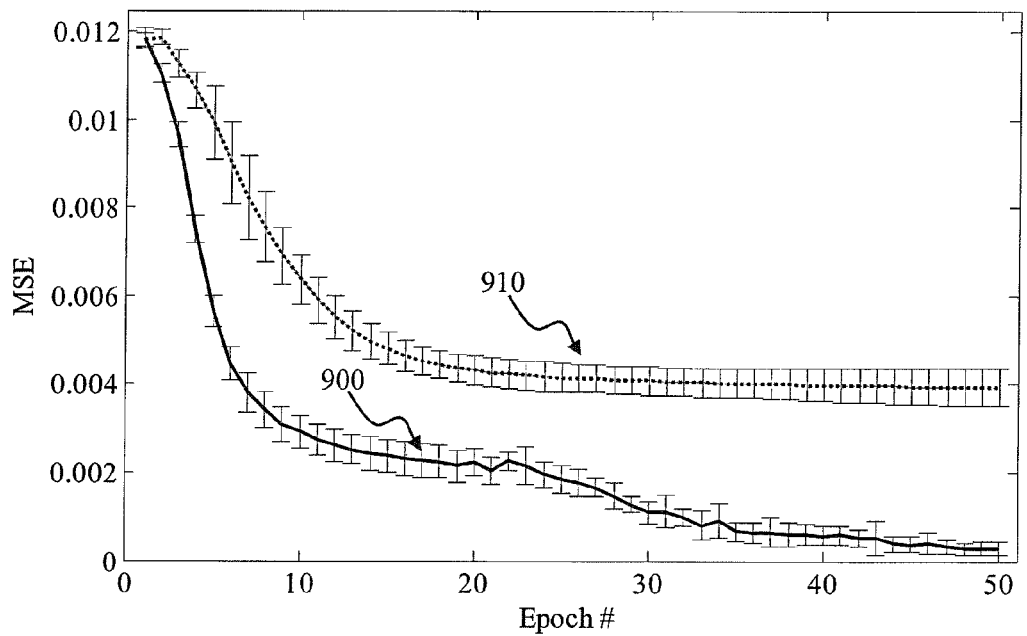
FIG. 9 presents data illustrating convergence of the structured exploration learning of the disclosure, in accordance with one or more implementations.

FIG. 9 presents the results of training of a spiking neural network using focused exploration methodology proposed in the disclosure and described, for example, by Eqn. 8, supra, applied to the function approximation task. The results of training using the prior art-rule of Eqn. 6, applied to the same network and the same task are also shown in FIG. 9 for comparison.

The single-layer feed-forward network used in the simulations described herein is configured as follows. The network is comprised of 60 LIF neurons and 400 spiking inputs; every input is connected to every neuron through an individual excitatory synaptic connection, in a manner depicted in FIG. 8 without mutual (lateral) connections between neurons. Adaptation parameters of the network comprise synaptic connection weights, which are initialized using a random Gaussian distribution with mean 0.75 and variance 0.07. The inputs to the network are repeatedly stimulated with a pre-defined spiking pattern $X(t)=\{x_n(t), \ldots, t)\}$ of a duration of 100 milliseconds (ms). The low-pass filtered versions of output spike trains $S(t)$ generated by individual neurons, and in some implementations in accordance with Eqns. 7-8, are additively combined to produce network output $y(t)$.

During simulations, the network may be trained to generate the output signal $y(t)$ that is configured to approximate a predefined, single channel target signal $y^d(t)$, also of duration of 100 ms. The performance of the network approximation may be quantitatively evaluated using the mean square error (MSE) metric. The learning process during a single presentation of the signals $X(t)$ and $y^d(t)$ to the network may be referred to as the "learning trial" or a "learning epoch". The exemplary simulation data presented in FIG. 9 were obtained using reinforcement signal $R(t)$ that is determined based on a difference between the present value of MSE at time t and the expected value of MSE at time t, where the expected MSE is calculated as a running average of the value of MSE at time t over the K trials preceding the present trial, augmented by an excitatory Gaussian current with zero mean and non-zero variance to each neuron.

The input X, associated with the data presented in FIG. 9, may be configured such that each of 400 input channels delivers a single spike during each learning trial, and the spike times for all channels are distributed uniformly over the learning trial length. In one implementation, the time of the input spike may be determined as T*n/N, where T is the trial length and N is the number of input channels (N=400 in the exemplary configuration of FIG. 9).

The solid thick line denoted 900 in FIG. 9 shows average of the MSE error measure between the network output y(t) and the target signal $y^d(t)$ as a function of the learning epoch and averaged over 10 different simulations, obtained using one implementation of the focused exploration methodology described supra. The thin vertical lines illustrate standard deviation of the results obtained during the particular simulations from the mean. The solid line 900 in FIG. 9 illustrates simulation results obtained using the associative focused exploration methodology approach of the disclosure, as described by Eqns. 9-11. The learning rule of the Eqn. 11 is configured as follows: $\eta_1=0.04$, $\eta_2=0.01\times\eta_1$; the exponential filters $\gamma_1$ and $\gamma_2$ of the term E1 are configured with the time constants $\tau_1=\tau_2=5$ ms, respectively; the term $E_2$ is determined using an exponential low-pass filter with the time constant of $\tau=5$ ms.

For comparison, simulation data obtained using the exploration methodology of prior art (e.g., Eqn. 6) is shown in FIG. 9 by the dashed line 910. The parameters of Eqn. 6 are configured as follows: $\eta=0.04$, the exponential filters $\gamma_1$ and $\gamma_2$ are configured with the time constants $\tau_1=\tau_2=5$ ms, respectively.

Comparison of simulation results obtained using the focused exploration methodology (solid line 900 in FIG. 9) and the prior art method (dashed line 910 in FIG. 9) shows that the exemplary implementation of focused exploration of the present disclosure advantageously produces faster learning convergence and a smaller residual error as compared to the prior art. In simulations obtained using the prior art, the MSE initial error is about $12\times10^{-3}$ units, and it decreases down to about $5\times10^{-3}$ units within the first 20 epochs. However, afterwards the performance reaches a plateau of about $5\times10^{-3}$ units, and further training does not improve approximation performance.

While the initial MSE value (line 900 in FIG. 9), obtained with the focused exploration methodology is similar to that of the prior art (line 910 in FIG. 9), the error decreases much more rapidly, and reaches the value of about $4\times10^{-3}$ units within 5 learning epochs, as compared to 30 epoch required by the prior art. Moreover, as training progresses, the MSE advantageously continues to decrease and approaches zero. The value of MSE shown by line 900 in FIG. 9 after 50 learning epochs is 10 times smaller than in the case of the prior-art method on the same learning epoch, and equals $0.4\times10^{-3}$ units.

During operation of the spiking network described with respect to FIG. 9 supra, initial values of weights of the input synaptic connections (e.g., connections 804 of FIG. 8) are determined using a Gaussian distribution, at time $t_1$ in FIG. 8. This causes some of the weights to be large enough such that the post-synaptic neurons (e.g., the neuron denoted by a hashed circle 802_2 in FIG. 8) receive super-threshold excitation. As these neurons may become activated (i.e., generate post-synaptic responses) their connections (e.g., the connections 804_2, associated with the neuron 802_2, denoted by thick arrows in FIG. 8) may be modified, using any of the applicable methodologies described herein, aiming at minimizing the approximation error.

Compared to the prior art, the focused exploration methodology described herein further employs selective connection adjustment, comprising connection adaptation for neurons for which the initial pre-synaptic input is sub-threshold. That is, the pre-synaptic inputs (e.g., connection weights of connections 804_1, 804_3) are not strong enough to cause the neuron (e.g., the neurons 802_1, 802_3 in the network 800 of FIG. 8) to generate post-synaptic responses. The focused exploration methodology of the disclosure described supra enables adaptation of these connections (e.g., the connections 824_1 in FIG. 8) via, for example, term $E_2$ of Eqn. 11), when network performance is not adequate and the reward signal R1(t) is negative. As a result, at a subsequent time $t_2$ (epoch), the input to some of the neurons 822 may become superthreshold and these neurons may generate post-synaptic response, as illustrated by the hashed circle 822_1 in FIG. 8. As a result, these newly activated neurons (e.g., the neuron 822_2) contribute to the minimization of the approximation error. Such focused exploration, enabled by connection weight adaptation in this implementation, enables provision of additional neural network resources that may be useful in achieving the learning task (e.g., error minimization in the implementation described with respect to FIG. 9). Some of the neurons (e.g., the neuron 822_3) may remain inactive at time t2 due to insufficiently strong pre-synaptic input 824_3.

Exemplary Uses and Applications of Certain Aspects of the Disclosure

As described herein, the use of focused exploration allows for obtaining different network configurations and exploration of alternate outcomes due to, at least partly, activation of different network resources that would remain unutilized in the prior art approaches. The exploration methodology of the disclosure overcomes drawbacks of the prior art, and advantageously effectuates faster convergence, characterized by a lower error within a smaller number of trials (shorter time), and also enables a larger portion of network resources to compete for a solution. Furthermore, the approach of the disclosure advantageously does not rely on frequent use of a random number generator at each trial, thereby substantially reducing computational load on the network computerized processing apparatus. These advantages may be traded for a reduced network complexity, size and cost for the same processing capacity, or increased network throughput for the same network size.

The learning approach described herein may be generally characterized in one respect as solving optimization problems through goal-oriented learning (supervised or reinforcement learning). In some implementations, training of neural network through focused reinforcement learning as described herein may be used to control an apparatus (e.g., a robotic device) in order to achieve a predefined goal, such as for example to find a shortest pathway in a maze, find a sequence that maximizes probability of a robotic device to collect all items (trash, mail, etc.) in a given environment (building) and bring it all to the waste/mail bin, while minimizing the time required to accomplish the task. This is predicated on the assumption or condition that there is an evaluation function that quantifies control attempts made by the network in terms of the cost function. Reinforcement learning methods such as for example those described in detail in U.S. patent application Ser. No. 13/238,932 filed Sep. 21, 2011, and entitled "ADAPTIVE CRITIC APPARATUS AND METHODS", incorporated supra, can be used to minimize the cost and hence to solve the control task, although it will be appreciated that other methods may be used consistent with the present innovation as well.

In one or more implementations, reinforcement learning is typically used in applications such as control problems, games and other sequential decision making tasks, although such learning is in no way limited to the foregoing.

The focused exploration may also be useful when minimizing errors between the desired state of a certain system and the actual system state, e.g.: train a robotic arm to follow a desired trajectory, as widely used in e.g., automotive assembly by robots used for painting or welding; while in some other implementations it may be applied to train an autonomous vehicle/robot to follow a given path, for example in a transportation system used in factories, cities, etc. Advantageously, the present innovation can also be used to simplify and improve control tasks for a wide assortment of control applications including without limitation HVAC, and other electromechanical devices requiring accurate stabilization, set-point control, trajectory tracking functionality or other types of control. Examples of such robotic devices may include medical devices (e.g. for surgical robots, rovers (e.g., for extraterrestrial exploration), unmanned air vehicles, underwater vehicles, smart appliances (e.g. ROOMBA®), robotic toys, etc.). The present innovation can advantageously be used also in all other applications of artificial neural networks, including: machine vision, pattern detection and pattern recognition, object classification, signal filtering, data segmentation, data compression, data mining, optimization and scheduling, or complex mapping.

In some implementations, the learning framework described herein may be implemented as a software library configured to be executed by an intelligent control apparatus running various control applications. The focused learning apparatus may comprise for example a specialized hardware module (e.g., an embedded processor or controller). In another implementation, the learning apparatus may be implemented in a specialized or general purpose integrated circuit, such as, for example ASIC, FPGA, or PLD). Myriad other implementations exist that will be recognized by those of ordinary skill given the present disclosure.

It will be recognized that while certain aspects of the innovation are described in terms of a specific sequence of steps of a method, these descriptions are only illustrative of the broader methods of the innovation, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the innovation disclosed and claimed herein.

While the above detailed description has shown, described, and pointed out novel features of the innovation as applied to various implementations, it will be understood that various omissions, substitutions, and changes in the form and details of the device or process illustrated may be made by those skilled in the art without departing from the innovation. The foregoing description is of the best mode presently contemplated of carrying out the innovation. This description is in no way meant to be limiting, but rather should be taken as illustrative of the general principles of the innovation. The scope of the innovation should be determined with reference to the claims.

What is claimed:

1. A method of operating a computerized spiking neuron operable in accordance with a process characterized by a learning parameter, said method comprising:
    modifying said learning parameter based at least in part on a reinforcement signal and a quantity relating to a first adjustment and a second adjustment;
    wherein:
        said reinforcement signal is configured based at least in part on a performance measure determined based at least in part on a present performance and a target performance associated with said process;
        said reinforcement signal comprises a negative reward determined based at least in part on said present performance being outside a predetermined measure from said target performance;
        said modifying said learning parameter is based at least in part on said reinforcement signal and is effectuated based at least in part on a spiking input received via an interface:
        said second adjustment is configured to increase a probability of said computerized spiking neuron generating a spiking output based on said spiking input; and
        said second adjustment is determined based at least in part on said computerized spiking neuron being previously inactive in response to receiving said spiking input.

2. The method of claim 1, wherein said quantity relating to said first and second adjustments comprises an aggregation of said first and second adjustments, and said first and said second adjustments are characterized by a first and a second eligibility traces. respectively.

3. The method of claim 2, wherein:
    said computerized spiking neuron is configured to receive an input via at least a first input interface:
    said first eligibility trace comprises a temporary record of occurrence of at least one event associated with said first input interface; and
    said second eligibility trace comprises a temporary record of occurrences of at least one other event associated with said first input interface.

4. The method of claim 1, wherein:
    said present performance is associated with a present state of said process that is based at least in part on a present value of said learning parameter; and
    said modifying comprises adapting said present value of said learning parameter based on said quantity relating to said first adjustment and said second adjustment.

5. The method of claim 1, wherein said computerized spiking neuron is characterized by a neuron state and an output-generation threshold;
    said computerized spiking neuron is characterized by an inactivity period; and
    said inactivity period is characterized by said neuron state remaining below said output-generation threshold.

6. The method of claim 5, wherein:
    said inactivity period is characterized by an absence of output being generated by said computerized spiking neuron: and
    said inactivity period is selected from a range of between of 5 ms and 200 ms inclusive.

7. The method of claim 5, where:
    said first adjustment is configured to decrease a probability of said computerized spiking neuron generating said spiking output based on said spiking input: and
    said computerized spiking neuron is characterized by at least another spiking output effectuated during a period wherein said computerized spiking neuron does not fire in response to receiving said spiking input.

8. The method of claim 7, wherein, said performance measure is determined based at least in part on a comparison between said present performance and said target performance, said performance measure selected from said group consisting of a squared error, a difference, an integrated squared error, and a median absolute deviation.

9. A controller apparatus comprising a non-transitory storage medium, said non-transitory storage medium configured to implement reinforcement learning in a neural network comprising a plurality of units, said non-transitory storage medium comprising a plurality of instructions configured to, when executed:
evaluate a network performance measure at a first time instance;
identify at least one unit of said plurality of units, said identified at least one unit characterized by an activity characteristic meeting a criterion; and
potentiate, based at least in part on said network performance measure being below a threshold of said identified at least one unit said potentiation characterized by an increase in said activity characteristic;
wherein said activity characteristic comprises a probability of said identified at least one unit generating a spiking output based on a spiking input; and
said potentiation is determined based at least in part on said identified at least one unit being previously inactive in response to receiving said spiking input.

10. The controller apparatus of claim 9, wherein said criterion comprises an activity of said identified at least one unit that is below a desired level within a time interval prior to said first time instance.

11. The controller apparatus of claim 10, wherein:
said identified at least one unit comprises a neuron;
said desired level corresponds to a node response generation threshold; and
said activity that is below said desired level is characterized by a node excitability being below said node response generation threshold.

12. The controller apparatus of claim 10, wherein:
said identified at least one unit comprises one or more spiking nodes characterized by a probability of generating a response;
said desired level corresponds to a response generation probability threshold; and
said activity that is below said desired level corresponds to said probability of generating said response being below said response generation probability threshold.

13. The controller apparatus of claim 10, wherein:
said identified at least one unit comprises one or more synaptic connections configured to communicate pre-synaptic spikes, said one or more synaptic connections each characterized by a synaptic efficacy parameter;
said desired level corresponds to a minimum number of pre-synaptic spikes; and
said activity that is below said desired level corresponds to said one or more synaptic connections communicating fewer pre-synaptic spikes compared to said minimum number of pre-synaptic spikes within said time interval prior to said first time instance.

14. A method of adjusting an efficacy of a synaptic connection configured to provide an input into a spiking neuron of a computerized spiking network, said method comprising:
based at least in part on (i) a negative reward indication, and (ii) provision of said input to said spiking neuron at a time, increasing said efficacy;
where said provision of said input is characterized by an absence of neural output within a time window relative to said time;
said negative reward indication is configured based at least in part on a performance measure determined based at least in part on a present performance and a target performance associated with a process;
said negative reward indication determined based at least in part on said present performance being outside a predetermined measure from said target performance;
said increasing said efficacy is based at least in part on said negative reward indication and is effectuated based at least in part on said input received via an interface; and
wherein said increasing said efficacy is determined based at least in part on said absence of neural output within a time window relative to said time.

15. The method of claim 14, wherein:
said spiking neuron is operated in accordance with a spike response process characterized by a sub-threshold state and a super-threshold state, said super-threshold state having an output response associated therewith; and
said absence of said neural output within a time window is characterized by said spiking neuron remaining in said sub-threshold state within said time window relative to said time.

16. The method of claim 15, further comprising reducing said efficacy based at least in part on (i) said negative reward indication, (ii) said provision of said input to said spiking neuron; and (iii) an output generated by said spiking neuron;
wherein said reducing said efficacy is configured to reduce a probability of a subsequent output generation by said spiking neuron in response to a subsequent input.

17. The method of claim 16, wherein said reducing said efficacy to reduce a probability of a subsequent output generation is configured to reduce a probability of said spiking neuron transitioning from said sub-threshold state to said super-threshold state in response to said subsequent input.

18. The method of claim 16, wherein said subsequent input is effectuated via said synaptic connection.

19. The method of claim 14, wherein said increasing said efficacy is configured to increase a probability of a subsequent output generation by said spiking neuron in response to a subsequent input.

20. The method of claim 14, wherein increasing said efficacy comprises increasing a synaptic weight of said synaptic connection.

21. A robotic apparatus having a plant and a controller, said robotic apparatus configured to:
the controller comprising a processor configured to;
identify an undesirable result of an action of said plant of said robotic apparatus; and
for said controller, perform at least one of:
(i) penalize at least one input source of a plurality of possible input sources that contributed to said undesirable result; and/or
(ii) potentiate at least a portion of said plurality of possible input sources that did not contribute to said undesirable result;
where:
said penalization is configured based at least in part on a performance measure determined based at least in part on a present performance and a target performance associated with a process;
said penalization comprises a negative reward determined based at least in part on said present performance being outside a predetermined measure from said target performance;

where said potentiation is based at least in part on a reinforcement signal and is effectuated based at least in part on a spiking input received via said at least one input source;

said potentiation is configured to increase a probability of a spiking neuron generating a spiking output based on said spiking input; and said potentiation is determined based at least in part on said spiking neuron being previously inactive in response to receiving said spiking input.

22. The robotic apparatus of claim 21, wherein said performing of at least (i) and/or (ii) comprises only performing (ii).

23. A computerized spiking neuron apparatus, said computerized spiking neuron apparatus comprising:

means for modifying a learning parameter based at least in part on a reinforcement signal and a quantity relating to a first adjustment and second adjustment:

wherein:

said reinforcement signal is configured based at least in part on a performance measure determined based at least in part on a present performance and a target performance associated with a process;

said reinforcement signal comprises a negative reward determined based at least in part on said present performance being outside a predetermined measure from said target performance;

said means for modifying said learning parameter is based at least in part on said reinforcement signal and is effectuated based at least in part on a spiking input received via an interface;

said second adjustment is configured to increase a probability of said computerized spiking neuron generating a spiking output based on said spiking input: and said second adjustment is determined based at least in part on said computerized spiking neuron being previously inactive in response to receiving said spiking input.

* * * * *